(12) United States Patent
Yamazumi et al.

(10) Patent No.: US 10,442,340 B2
(45) Date of Patent: Oct. 15, 2019

(54) HEADLIGHT MODULE AND HEADLIGHT

(71) Applicant: MITSUBISHI ELECTRIC CORPORATION, Tokyo (JP)

(72) Inventors: Mitsuhiro Yamazumi, Tokyo (JP); Ritsuya Oshima, Tokyo (JP); Atsushi Michimori, Tokyo (JP); Masashige Suwa, Tokyo (JP); Kuniko Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 7 days.

(21) Appl. No.: 15/568,215

(22) PCT Filed: Feb. 23, 2016

(86) PCT No.: PCT/JP2016/055182
§ 371 (c)(1),
(2) Date: Oct. 20, 2017

(87) PCT Pub. No.: WO2016/189907
PCT Pub. Date: Dec. 1, 2016

(65) Prior Publication Data
US 2018/0118093 A1      May 3, 2018

(30) Foreign Application Priority Data
May 25, 2015   (JP) ................... 2015-105653

(51) Int. Cl.
*B60Q 1/00* (2006.01)
*B60Q 1/076* (2006.01)
(Continued)

(52) U.S. Cl.
CPC ........... *B60Q 1/076* (2013.01); *B60Q 1/1423* (2013.01); *F21S 41/00* (2018.01); *F21S 41/147* (2018.01);
(Continued)

(58) Field of Classification Search
CPC .......... F21S 41/25; F21S 41/29; F21S 41/295; F21S 41/255; F21S 41/265; F21S 41/27;
(Continued)

(56) References Cited

U.S. PATENT DOCUMENTS 5,138,540 A    8/1992 Kobayashi et al.
5,153,485 A    10/1992 Yamada et al.
(Continued)

FOREIGN PATENT DOCUMENTS

EP    2 522 897 A2    11/2012
JP    63-148197 U      9/1988
(Continued)

*Primary Examiner* — Matthew J. Peerce
(74) *Attorney, Agent, or Firm* — Birch, Stewart, Kolasch & Birch, LLP

(57) ABSTRACT

A headlight module includes: a light source that emits light; a projection lens that receives and emits the light; a holder including a flexible portion having a length in a direction of an optical axis of the lens and having a fixed end and a movable end, the holder holding the lens movably relative to the light source by holding the lens with the movable end; and a driver that moves the lens. The lens is translated on a plane perpendicular to the axis due to deflection of the flexible portion. The holder includes first and second flexible portions including plate-like portions parallel to the axis and perpendicular to each other. One end of the first flexible portion is the fixed end. Another end of the first flexible portion is connected to one end of the second flexible portion. Another end of the second flexible portion is the movable end.

14 Claims, 22 Drawing Sheets

(51) Int. Cl.
  *F21S 41/00*     (2018.01)
  *F21S 41/148*    (2018.01)
  *B60Q 1/14*      (2006.01)
  *F21S 41/147*    (2018.01)
  *F21S 41/29*     (2018.01)
  *F21S 41/25*     (2018.01)
  *F21S 41/32*     (2018.01)
  *F21S 41/63*     (2018.01)

(52) U.S. Cl.
  CPC ............ *F21S 41/148* (2018.01); *F21S 41/25* (2018.01); *F21S 41/295* (2018.01); *F21S 41/322* (2018.01); *F21S 41/635* (2018.01); *B60Q 2200/36* (2013.01); *B60Q 2300/056* (2013.01)

(58) Field of Classification Search
  CPC ........ F21S 41/429; F21S 41/63; F21S 41/657; F21S 41/635; F21W 2102/00; F21W 2102/10; F21W 2102/13; F21W 2102/14; F21W 2102/165; F21W 2102/19; B60Q 1/045; B60Q 1/06; B60Q 1/0483; B60Q 1/072; B60Q 1/10; B60Q 1/11; B60Q 1/124
  USPC ......................................................... 362/466
  See application file for complete search history.

(56) References Cited

U.S. PATENT DOCUMENTS

| | | | |
|---|---|---|---|
| 2002/0149947 A1* | 10/2002 | Butera | B60Q 1/076 362/513 |
| 2009/0046474 A1 | 2/2009 | Sato et al. | |
| 2009/0290204 A1* | 11/2009 | Hirata | G01S 7/4814 359/199.1 |
| 2016/0137122 A1 | 5/2016 | Oshima et al. | |

FOREIGN PATENT DOCUMENTS

| | | |
|---|---|---|
| JP | 3-204430 A | 9/1991 |
| JP | 8-3922 Y1 | 1/1996 |
| JP | 2008-158185 A | 7/2008 |
| JP | 2009-48786 A | 3/2009 |
| JP | 2000-155373 A | 11/2012 |
| JP | 2012-238417 A | 12/2012 |
| WO | WO 2015/004905 A1 | 1/2015 |

\* cited by examiner

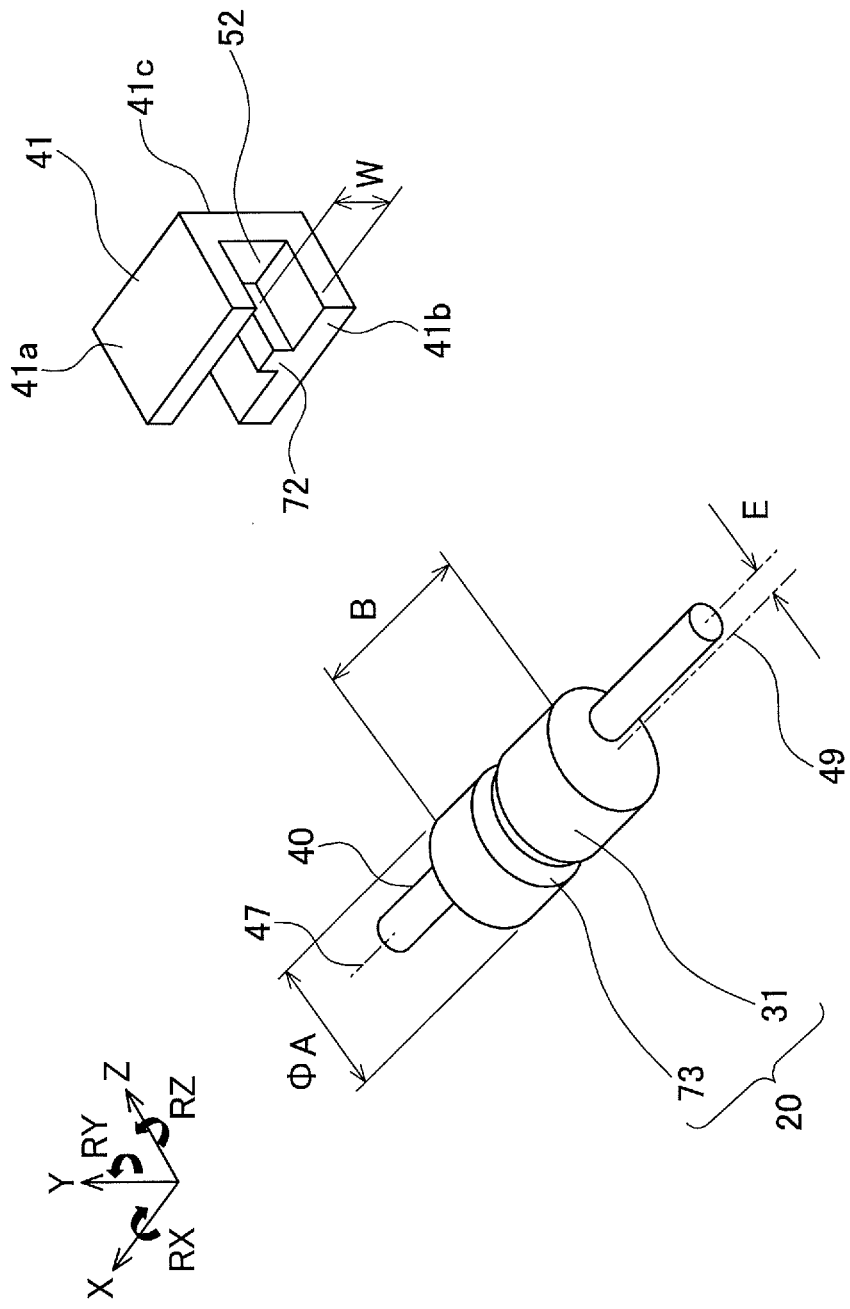

HEADLIGHT MODULE AND HEADLIGHT

TECHNICAL FIELD

The present invention relates to a vehicle headlight, and in particular to a small headlight module capable of changing a light distribution depending on traveling conditions.

BACKGROUND ART

In European regulations, an adaptive front lighting system (AFS) has been specified. The AFS changes a light distribution pattern of a headlight during traveling in response to change in movement of a vehicle or change in environment outside the vehicle. For example, a headlight equipped with an AFS moves a light distribution in a left-right direction to ensure a wide field of view including a point of gaze of a driver who is traveling in a curve. The headlight equipped with the AFS allows the driver to quickly find obstacles, such as persons, animals, or parked vehicles. Thus, the driver can take evasive action with respect to an obstacle or the like more safely.

When a person, baggage, or the like is placed on a seat of a vehicle, the vehicle tilts in a front-back direction. Also, when the vehicle accelerates or decelerates, the vehicle tilts in the front-back direction. This shifts the light distribution of the headlight in an up-down direction. This causes the problem of dazzling an oncoming vehicle. "Dazzling" refers to confusing a person's vision. Against this problem, there is known an auto-leveling function of moving an optical axis of a light distribution of a headlight in an up-down direction.

A headlight equipped with an AFS capable of moving a light distribution in a left-right direction or an up-down direction can improve ensuring of the field of view of a driver and reduce dazzling of an oncoming vehicle, thereby contributing traffic safety. From these, there is a demand for a headlight that changes a light distribution pattern by moving a light distribution in a left-right direction or an up-down direction.

Patent Literature 1 discloses a drive mechanism that linearly moves a lens in a direction of an optical axis and a direction of an axis perpendicular to the optical axis. "Linearly moves" refers to causing it to move linearly.

CITATION LIST

Patent Literature

Patent Literature 1: Japanese Utility Model Publication No. 8-3922

SUMMARY OF INVENTION

Technical Problem

However, a mechanism described in Patent Literature 1 that controls a light distribution by linearly moving a lens includes a sliding portion, and thus the mechanism is complicated. When it is driven in multiple directions in a plane perpendicular to an optical axis, the mechanism described in Patent Literature 1 is large.

The present invention provides a small headlight module equipped with a drive mechanism that moves a light distribution in a left-right direction or an up-down direction.

Solution to Problem

A headlight module according to the present invention includes: a light source that emits light; a projection lens that receives the light as incident light and emits the light as projection light; a holder including a flexible portion having a length in a direction of an optical axis of the projection lens, the flexible portion having one end that is a fixed end and another end that is a movable end, the holder holding the projection lens movably with respect to the light source by holding the projection lens with the movable end; and a driver that moves the projection lens, wherein the projection lens is translated on a plane perpendicular to the optical axis of the projection lens due to deflection of the flexible portion.

Advantageous Effects of Invention

The headlight module according to the present invention can suppress increase in size of a structure capable of moving a light distribution on a plane perpendicular to a projecting direction.

BRIEF DESCRIPTION OF DRAWINGS

FIG. 22 is a diagram illustrating a modification of components of the headlight module according to the second embodiment.

DESCRIPTION OF EMBODIMENTS

Figure 1:
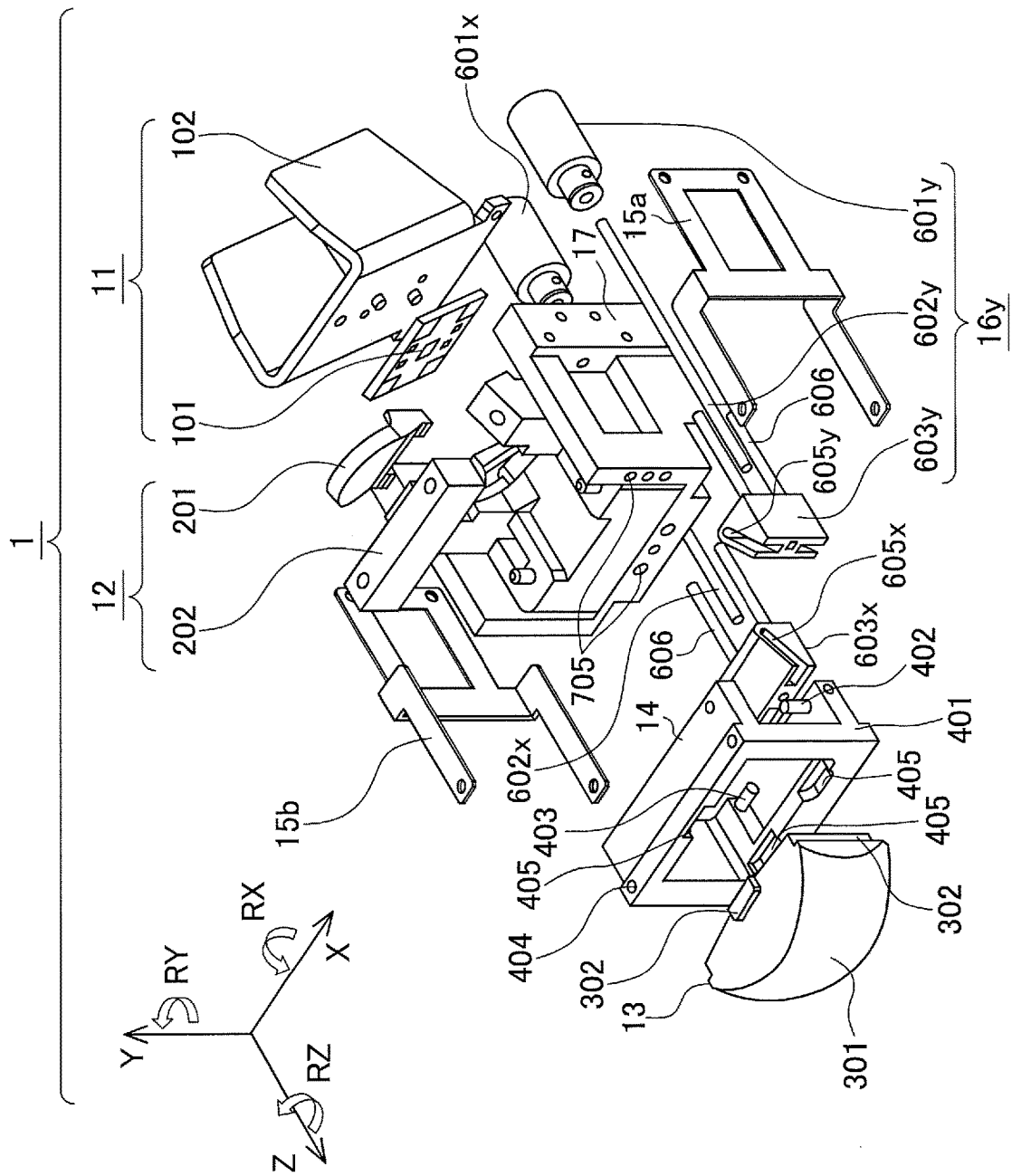
FIG. 1 is an exploded perspective view of a headlight module according to a first embodiment.

A headlight module according to the present invention includes: a light source that emits light; a projection lens that receives, as incident light, light emitted from the light source and emits, as projection light, the incident light ahead of a vehicle; a holder including a flexible portion having a length in a direction of an optical axis of the projection lens, the flexible portion having one end that is a fixed end and another end that is a movable end, the projection lens being connected to the movable end, the holder holding the projection lens so that the projection lens can translate on a plane perpendicular to the optical axis of the projection lens with respect to an optical member, due to deflection of the flexible portion; and a driver that moves the projection lens on the plane.

Another headlight module according to the present invention includes: a light source; a projection lens that receives, as incident light, light emitted from the light source and emits, as projection light, the incident light ahead of a vehicle; an adjusting shaft including a connection portion connected to the projection lens; and a driver that drives the projection lens adjusting shaft in a direction of the adjusting shaft and rotates the projection lens adjusting shaft about the shaft, wherein the connection portion includes an eccentric portion having a central axis at a position different from that of a rotational axis of the adjusting shaft.

First Embodiment

In European regulations, light sources (referred to below as semiconductor light sources) using semiconductors have recently been approved for vehicle headlights. Semiconductor light sources include, for example, LED light sources and laser light sources. From such reasons, vehicle headlights have been downsized by employing semiconductor light sources. In a first embodiment, a light source 11 is described as, for example, an LED light source.

In a light distribution of light emitted from a light source portion of a vehicle headlight, a cutoff line is formed at an upper edge of a light distribution pattern. Formation of the cutoff line is specified by regulations. The light distribution pattern is formed by, for example, light shielding by means of a shade (e.g., a light blocking plate). The light distribution pattern is also formed by, for example, reflection by means of a reflector (e.g., a reflection mirror). The light distribution pattern is also formed by, for example, refraction by means of a lens.

"Light distribution" refers to a luminous intensity distribution of a light source with respect to space. That is, it refers to a spatial distribution of light emitted from a light source. "Light distribution pattern" refers to a shape of a light beam and an intensity distribution of light due to the direction of light emitted from a light source. Thus, shifting a light radiation direction in a left-right direction or an up-down direction is also included in change in the "light distribution pattern". "Light distribution pattern" will also be used to mean an illuminance pattern on an irradiated surface 9 (a plane virtually located in front of a headlight), described below. For example, a shape of a light distribution specified by regulations or the like is also referred to as a light distribution pattern. "Light distribution" refers to a distribution of intensity of light emitted from a light source with respect to the direction of the light. "Light distribution" will also be used to mean an illuminance distribution on the irradiated surface 9, described below.

To facilitate explanation, XYZ-orthogonal coordinate axes are shown in drawings. In the following description, it will be assumed that a forward direction of a headlight module is the +Z axis direction and a backward direction is the −Z axis direction. That is, a direction (projecting direction) in which the headlight module emits light is the +Z axis direction. It will be assumed that, as viewed in the forward direction, a leftward direction is the +X axis direction and a rightward direction is the +X axis direction. It will be assumed that an upward direction (direction toward the sky) of the headlight module is the +Y axis direction and a downward direction (direction toward the ground) of the headlight module is the −Y axis direction.

It will be assumed that, when the headlight module is viewed from the backward direction (−Z axis direction) side, a clockwise direction about the Z axis is the +RZ direction and a counterclockwise direction about the Z axis is the −RZ direction. It will also be assumed that, when the headlight module is viewed from the right (−X axis direction side), a clockwise direction about the X axis is the +RX direction and a counterclockwise direction about the X axis is the −RX direction. It will also be assumed that, when the headlight module is viewed from the downward direction (−Y axis direction) side, a clockwise direction about the Y axis is the +RY axis direction and a counterclockwise direction about the Y axis is the −RY axis direction.

Figure 2:
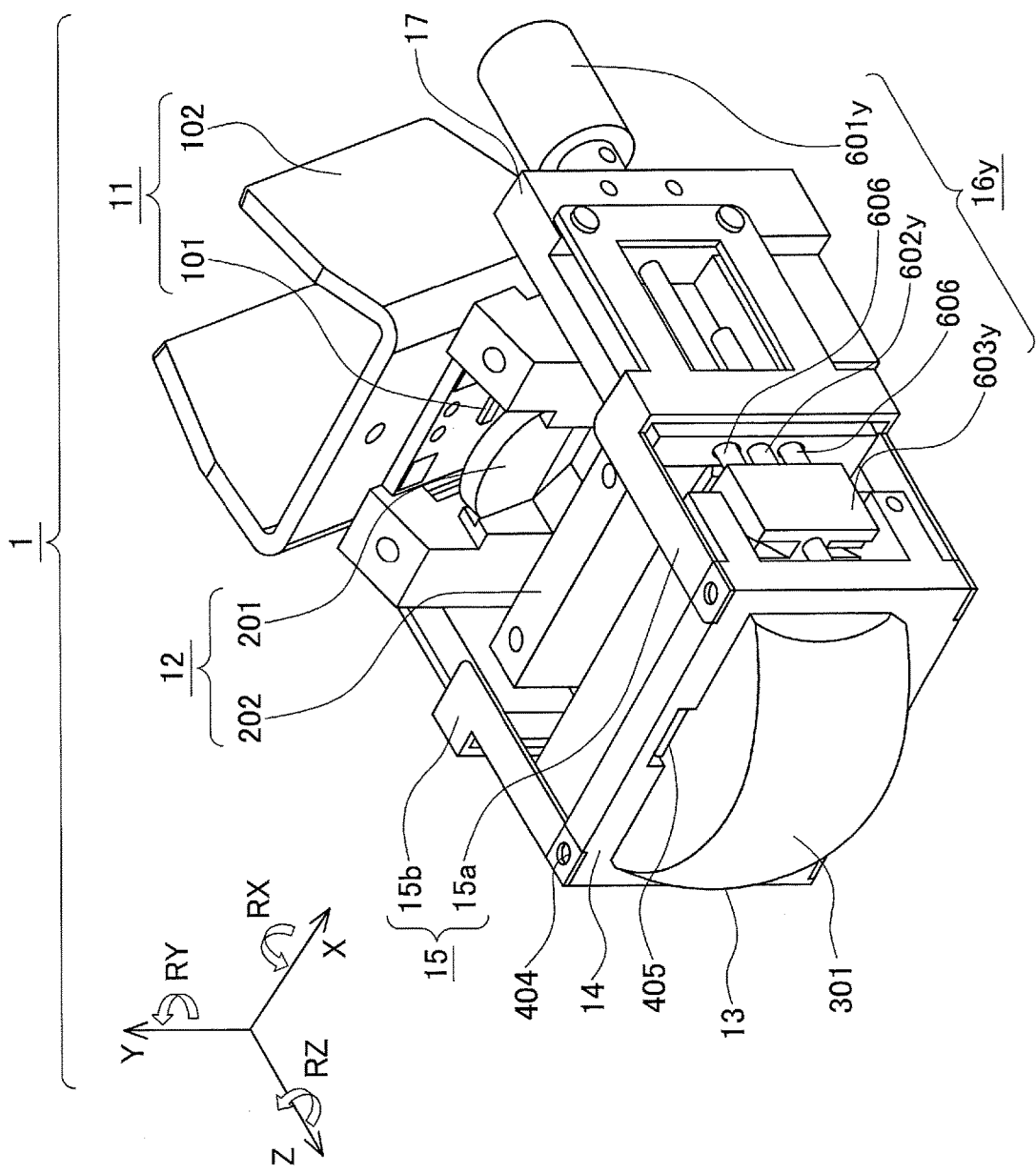
FIG. 2 is an assembly diagram of the headlight module according to the first embodiment.
Figure 3:
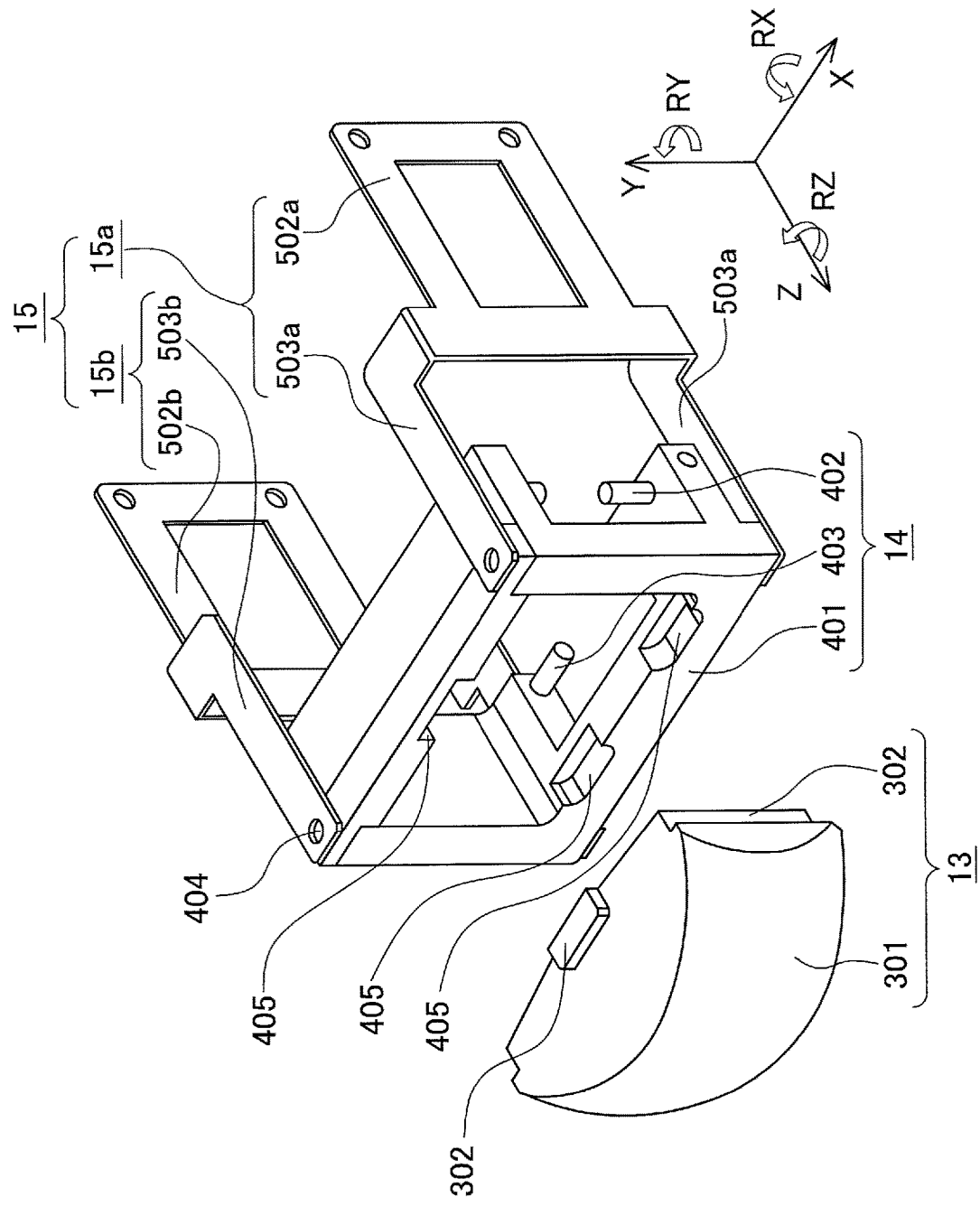
FIG. 3 is a diagram of components of the headlight module according to the first embodiment.
Figure 4:
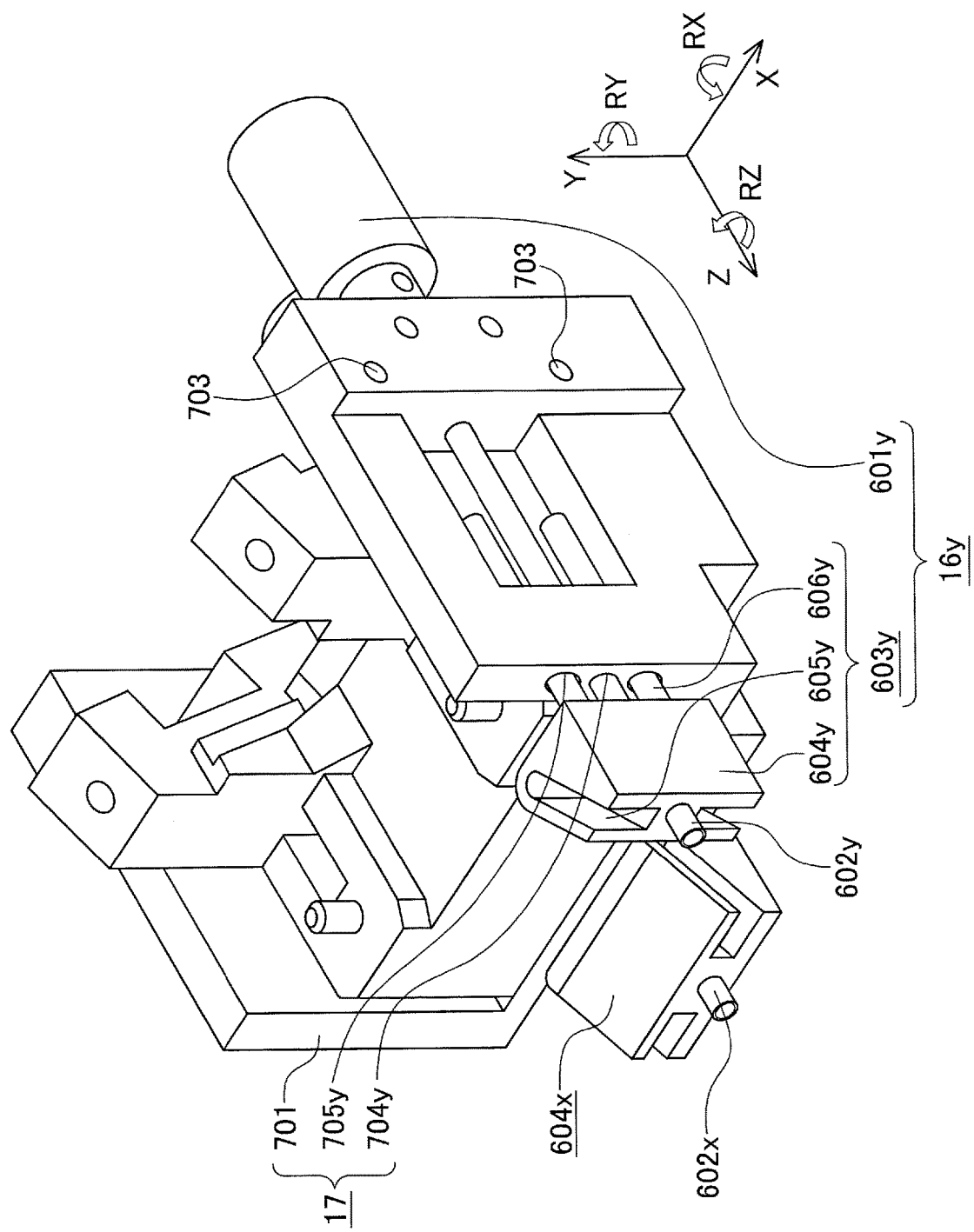
FIG. 4 is a diagram of components of the headlight module according to the first embodiment.

FIG. 1 is an exploded perspective view of a headlight module 1 according to the first embodiment. FIG. 2 is a perspective assembly view of the headlight module 1 according to the first embodiment. FIGS. 3 and 4 are each a perspective view illustrating a part of the headlight module according to the first embodiment.

The headlight module 1 according to the first embodiment includes the light source 11, a projection lens 13, a holder 15, and a driver 16. The headlight module 1 may include an optical unit 12, a lens holder 14, and a base 17. The holder 15 includes holders 15a and 15b and is, for example, parallel springs in the first embodiment.

<Components of Optical System>

The light source 11 may use a light emitting diode (LED), a xenon lamp, a halogen lamp, or the like. The light source 11 may also use an electroluminescence element, a semiconductor laser, a light source that irradiates phosphor applied on a flat surface with excitation light to cause it to emit light, or the like. Since the light source 11 produces heat, it may include a heat dissipation unit for releasing the heat to the outside. The light source 11 of the headlight module 1 according to the first embodiment includes an LED light source 101 and a heat dissipation unit 102.

In the first embodiment, the light source 11 is held by the base 17.

The optical unit 12 concentrates light emitted from the light source 11 or forms a light distribution pattern, and emits light with a predetermined light distribution in the +Z axis direction. Here, "predetermined light distribution" refers to, for example, a light distribution satisfying the above regulations. Also, for example, when a single light distribution pattern is formed using multiple headlight modules 1, the predetermined light distribution is a light distribution assigned to a certain one of the headlight modules 1.

The optical unit 12 is, for example, a lens, a light guide member, or the like. The optical unit 12 may also use a shade or a reflector. The optical unit 12 of the headlight module 1 according to the first embodiment includes a lens 201 and a light guide member 202. Since the headlight module 1 of the first embodiment forms a light distribution by means of the lens 201 and light guide member 202, it has the feature that the optical unit 12 is small.

The optical unit 12 is held by the base 17 by, for example, being pressed against the base 17 by a plate spring. The lens 201 and light guide member 202 may be held by adhesion with adhesive or by fastening with a screw or the like.

The light guide member 202 is, for example, a light guide, a light pipe, or the like. "Light guide" refers to an optical element that efficiently guides light entering through one side to the other side by using internal reflection in a transparent member made of acrylic resin or the like. "Light pipe" refers to an optical element that guides light entering through one side to the other side by multiple reflections of light rays by an inner surface of a hollow member. There are a light guide member that is a hollow body with its side surface being a mirror, and a light guide member that is a polygonal column made of transparent material, such as glass, and that uses total reflection at side surfaces.

An emitting surface of the light guide member 202 is located at a position optically conjugate to the irradiated surface 9. "Optically conjugate" refers to a relation in which light emitted from one point is imaged at another point. The shape of light on the emitting surface is projected onto the irradiated surface 9. The shape of the emitting surface of the light guide member 202 is projected onto the irradiated surface 9. A focal point of the projection lens 13 is located on the emitting surface of the light guide member 202.

The projection lens 13 projects light emitted from the optical unit 12 in the +Z axis direction. The projection lens 13 has, for example, positive refractive power (or positive power). The projection lens 13 of the headlight module 1 according to the first embodiment includes a lens surface 301 and flange portions 302.

For example, a line connecting centers of curvature of both surfaces of the lens surface 301 is parallel to the Z axis. That is, an optical axis of the projection lens 13 is parallel to the Z axis.

The flange portions 302 are formed at end surfaces in the X axis direction and end surfaces in the Y axis direction of the projection lens 13. Some of the flange portions 302 have convex shapes projecting from end surfaces of the projection lens 13. The others of the flange portions 302 have stepped shapes obtained by cutting off edges of end surfaces of the lens surface 301. The projection lens 13 is held by the lens holder 14 through the flange portions 302.

<Lens Holder 14>

The lens holder 14 includes a lens holder body 401. The lens holder 14 may also include an X axis adjustment shaft 402 or a Y axis adjustment shaft 403. The lens holder 14 may also have female screw holes 404.

The lens holder body 401 is a part that holds the projection lens 13.

The lens holder body 401 has a frame shape.

The lens holder body 401 has, for example, a frame shape that is non-intrusive with respect to an incident surface of the projection lens 13 as viewed from the −Z axis direction side. "Non-intrusive" refers to not entering. That is, it indicates that the lens holder body 401 does not block light emitted from the optical unit 12.

The lens holder body 401 covers the stepped shapes of the flange portions 302. The lens holder body 401 also has fitting portions 405 that cover the convex shapes of the flange portions 302. The projection lens 13 is positioned on the lens holder body 401 by the flange portions 302.

The projection lens 13 is fixed to the lens holder body 401 using a spring (e.g., a spring metal fitting), a screw, adhesive, or the like.

The X axis adjustment shaft 402 is a pair of shafts that are disposed parallel to the Y axis and face each other. Thus, the X axis adjustment shaft 402 includes two shafts. The X axis adjustment shaft 402 is formed at an end portion in the +X axis direction of the lens holder body 401. The X axis adjustment shaft 402 is formed on the inside of the lens holder body 401. The X axis adjustment shaft 402 is fitted in cam grooves 605$y$ provided in a cam part 603$y$ of a driver 16$y$ included in the driver 16, described later.

The Y axis adjustment shaft 403 is a pair of shafts that are disposed parallel to the X axis and face each other. Thus, the Y axis adjustment shaft 403 includes two shafts. The Y axis adjustment shaft 403 is formed at an end portion in the −Y axis direction of the lens holder body 401. The Y axis adjustment shaft 403 is formed on the inside of the lens holder body 401. The Y axis adjustment shaft 403 is fitted in cam grooves 605$x$ provided in a cam part 603$x$ of a driver 16$x$ included in the driver 16, described later.

The cam part 603$x$ and cam part 603$y$ will be collectively referred to as the cam parts 603. The cam grooves 605$x$ and cam grooves 605$y$ will be collectively referred to as the cam grooves 605.

The female screw holes 404 are provided in a surface on the +Y axis direction side and a surface on the −Y axis direction side of the lens holder body 401. Some of the female screw holes 404 are provided at an end portion on the +X axis direction side and an end portion on the −X axis direction side of the surface on the +Y axis direction side of the lens holder body 401. The others of the female screw holes 404 are provided at an end portion on the +X axis direction side and an end portion on the −X axis direction side of the surface on the −Y axis direction side of the lens holder body 401.

The female screw holes 404 are screw holes parallel to the Y axis. The female screw holes 404 are screw holes for connecting Y axis direction flexible portions 503$a$ and 503$b$, described later, of the holder 15 to the lens holder body 401. The lens holder 14 is fixed to the holder 15 by means of screws through the female screw holes 404 provided in the lens holder 14. The lens holder 14 may also be fixed to the holder 15 by means of adhesive without providing the female screw holes 404.

The lens holder 14 is attached to the base 17 through the holder 15. The holder 15 is composed of plate springs. The holder 15 allows the lens holder 14 to move in the X axis direction or Y axis direction relative to the base 17. Taking advantage of deflection of the plate springs, the lens holder 14 can move in the X axis direction or Y axis direction.

The lens holder 14 is held by the driver 16 through the X axis adjustment shaft 402 or Y axis adjustment shaft 403. The positions of the lens holder 14 in the X axis direction and Y axis direction are determined by the X axis adjustment shaft 402, Y axis adjustment shaft 403, and the cam parts 603 of the driver 16.

The position of the lens holder 14 in the X axis direction is determined by the X axis adjustment shaft 402 and cam part 603$y$. The position of the lens holder 14 in the Y axis direction is determined by the Y axis adjustment shaft 403 and cam part 603$x$.

In the first embodiment, the X axis adjustment shaft 402 and Y axis-adjustment shaft 403 are provided on the projection lens 13 side, and the cam grooves 605x and 605y are provided on the driver 16 side. However, the cam grooves 605x and 605y may be provided on the projection lens 13 side, and the X axis adjustment shaft 402 and Y axis adjustment shaft 403 may be provided on the driver 16 side. It is sufficient that the projection lens 13 side and driver 16 side constitute a cam mechanism.

<Holder 15>

The holder 15 will now be described with reference to FIG. 3.

The holder 15 is composed of springs. As described above, the holder 15 is composed of, for example, plate springs. The holder 15 has a plate-like shape. The holder 15 has, for example, a thin plate-like shape.

In the first embodiment, the holder 15 is made of spring material. However, the holder 15 is a member for moving the projection lens 13 in the X axis direction or Y axis direction while maintaining the attitude of the projection lens 13. Thus, the holder 15 need not necessarily be made of spring material.

In the first embodiment, since the holder 15 can be easily made by folding metal sheets, it is described as "springs". Further, when the holder 15 is made of spring material, it is possible to reduce rattling between the pins and the grooves of the cam mechanisms including, as its elements, the X axis adjustment shaft 402, Y axis adjustment shaft 403, and cam parts 603.

The holder 15 is formed by folding metal sheets. However, it is possible to employ a configuration in which X direction flexible portions 502 and Y direction flexible portions 503, which are plate-like, are connected to each other using resin or the like. This configuration can be achieved by, for example, using insert molding. Typically, insert molding is a forming method of injecting resin around metal parts inserted in a mold to integrate the metal parts with the resin.

In the first embodiment, the two holders 15a and 15b are used. The holder 15 includes two plate springs as a pair. The two holders 15a and 15b are used as parallel springs.

The holder 15a is attached to a side surface in the +X axis direction of the base 17. The holder 15b is attached to a side surface in the −X axis direction of the base 17. The holder 15 includes the X axis direction flexible portions 502 and Y axis direction flexible portions 503.

The X axis direction flexible portions 502 collectively represent an X axis direction flexible portion 502a and an X axis direction flexible portion 502b.

The X axis direction flexible portions 502 have plate-like shapes. The X axis direction flexible portions 502 have rectangular shapes. In FIG. 3, to adjust the spring force, an opening is provided at a central part of each of the X axis direction flexible portions 502.

The X axis direction flexible portions 502 are arranged parallel to a YZ plane. One ends of the X axis direction flexible portions 502 are attached to the base 17. In FIG. 3, their end portions in the −Z axis direction are attached to the base 17. The X axis direction flexible portions 502 are attached to the side surfaces of the base 17. The X axis direction flexible portions 502 are, for example, fastened to the base 17 by screws.

The X axis direction flexible portions 502 bend in the X axis direction with respect to the portions attached to the base 17, thereby moving the projection lens 13 in the X axis direction.

The Y axis direction flexible portions 503 collectively represent the Y axis direction flexible portions 503a and Y axis direction flexible portions 503b.

The Y axis direction flexible portions 503 have plate-like shapes. The Y axis direction flexible portions 503 have rectangular shapes.

The Y axis direction flexible portions 503 are arranged parallel to a ZX plane. One ends of the Y axis direction flexible portions 503 are connected to the X axis direction flexible portions 502. In FIG. 3, end portions in the −Z axis direction of the Y axis direction flexible portions 503 are connected to end portions in the +Z axis direction of the X axis direction flexible portions 502.

The Y axis direction flexible portions 503a are a pair of sheets facing each other in parallel. The Y axis direction flexible portions 503b are a pair of sheets facing each other in parallel. One of the Y axis direction flexible portions 503a and one of the Y axis direction flexible portions 503b are attached to end portions in the +Y axis direction of the X axis direction flexible portions 502. The other of the Y axis direction flexible portions 503a and the other of the Y axis direction flexible portions 503b are attached to end portions in the −Y axis direction of the X axis direction flexible portions 502.

Deflection of the flexible portions 502 and 503 allows the projection lens 13 to translate on a plane (XY plane) perpendicular to the optical axis of the projection lens 13 while being guided by the holder 15.

In FIG. 3, the Y axis direction flexible portions 503a are formed so that they are bent by 90 degrees in the −X axis direction with respect to the X axis direction flexible portion 502a. The Y axis direction flexible portions 503b are formed so that they are bent by 90 degrees in the +X axis direction with respect to the X axis direction flexible portion 502b.

The other ends of the Y axis direction flexible portions 503 are attached to the lens holder body 401. End portions in the +Z axis direction of the Y axis direction flexible portions 503 are attached to the lens holder body 401.

One of the Y axis direction flexible portions 503a on the +Y axis direction side and one of the Y axis direction flexible portions 503b on the +Y axis direction side are attached to an end portion in the +Y axis direction of the lens holder body 401. The other of the Y axis direction flexible portions 503a on the −Y axis direction side and the other of the Y axis direction flexible portions 503b on the −Y axis direction side are attached to an end portion in the −Y axis direction of the lens holder body 401.

In the first embodiment, the Y axis direction flexible portions 503a and 503b are, for example, fastened to the female screw holes 404 provided in the lens holder body 401 by screws.

When the X axis adjustment shaft 402 and Y axis adjustment shaft 403 are formed directly on the projection lens 13, the holder 15 may be connected directly to the projection lens 13.

The X axis direction flexible portions 502 bend in the X axis direction with respect to the base 17, and thereby can move the lens holder 14 and projection lens 13 in the X axis direction. On the other hand, the Y axis direction flexible portions 503 bend in the Y axis direction with respect to the portions connected to the X axis direction flexible portions 502, and thereby can move the lens holder 14 and projection lens 13 in the Y axis direction.

The light source 11 is held by the base 17. The holder 15 holds the projection lens 13 so that the projection lens 13 can move in the X axis direction or Y axis direction with respect to the base 17. The holder 15 holds the projection lens 13 so that the projection lens 13 can move in the X axis direction or Y axis direction with respect to the light source 11.

As above, the holder 15 is composed of the multiple plate springs. It is a mechanism capable of moving the lens holder 14 and projection lens 13 in multiple directions without a sliding portion.

It is also possible to reverse the X axis direction flexible portions 502 and Y axis direction flexible portions 503 in the Z axis direction and attach the holder 15 to a side surface in the +X axis direction and a side surface in the −X axis direction of the lens holder body 401.

As above, the projection lens 13 is held by the holders 15a and 15b movably on the plane (XY plane) perpendicular to the optical axis, due to deflection of the X axis direction flexible portions 502a and 502b and Y axis direction flexible portions 503a and 503b. The lens holder 14 is held by the X axis direction flexible portions 502a and 502b movably in the X axis direction relative to the base 17. The lens holder 14 is also held by the Y axis direction flexible portions 503a and 503b movably in the Y axis direction relative to the base 17.

On the other hand, the holders 15a and 15b do not allow the lens holder 14 to move in the Z axis direction relative to the base 17. The holders 15a and 15b do not allow the lens holder 14 to rotate in the RX axis direction relative to the base 17. The holders 15a and 15b do not allow the lens holder 14 to rotate in the RY axis direction relative to the base 17. The holders 15a and 15b do not allow the lens holder 14 to rotate in the RZ direction relative to the base 17.

The holders 15a and 15b provide a degree of freedom of the lens holder 14 relative to the base 17 in the X axis direction and Y axis direction. That is, the holders 15a and 15b allow the lens holder 14 to move in the X axis direction and Y axis direction relative to the base 17. The holders 15a and 15b constrain degrees of freedom of the lens holder 14 relative to the base 17 in the Z axis direction, RX axis direction, RY axis direction, and RZ direction. That is, the holders 15a and 15b prevent the lens holder 14 from moving in the Z axis direction and rotating in the RX axis direction, RY axis direction, and RZ direction relative to the base 17.

<Driver 16>

The driver 16 will now be described with reference to FIGS. 1 and 2.

The driver 16 moves the projection lens 13, which is movable in the X axis direction or Y axis direction relative to the light source 11. The driver 16 holds the projection lens 13, which is movable in the X axis direction or Y axis direction relative to the light source 11, at a certain position.

The driver 16 includes drive sources 601, feed screw shafts 602, and the cam parts 603.

A configuration of the driver 16 for moving the lens holder 14 parallel to the Y axis will be referred to as the driver 16x (the reference character 16x is omitted in FIGS. 1 and 2 for simplicity). The driver 16x includes a drive source 601x, a feed screw shaft 602x, and the cam part 603x.

A configuration of the driver 16 for moving the lens holder 14 parallel to the X axis will be referred to as the driver 16y. The driver 16y includes a drive source 601y, a feed screw shaft 602y, and the cam part 603y.

The drive sources 601 collectively represent the drive sources 601x and 601y. The feed screw shafts 602 collectively represent the feed screw shafts 602x and 602y.

The driver 16 moves the cam parts 603 using the drive sources 601 and feed screw shafts 602. In the first embodiment, the driver 16 moves the cam parts 603 in the Z axis direction.

In FIG. 4, the cam parts 603 include cam bodies 604, the cam grooves 605, and support shafts 606. The cam bodies 604 collectively represent a cam body 604x and a cam body 604y. The support shafts 606 collectively represent support shafts 606x and support shafts 606y.

In FIG. 1, the headlight module 1 includes the two drivers 16x and 16y to move the projection lens 13 in the X axis direction or Y axis direction. In FIG. 1, for example, the driver 16x is located on a bottom surface on the −Y axis side of the base 17. The driver 16y is, for example, located on a side surface on the +X axis side of the base 17.

The drive sources 601 are, for example, stepping motors, DC motors, or the like. In FIG. 1, the drive source 601x of the driver 16x is located on the −Z axis direction side of the bottom surface on the −Y axis side of the base 17. The drive source 601y of the driver 16y is located on the −Z axis direction side of the side surface on the +X axis side of the base 17.

Shafts of the drive sources 601 are disposed parallel to the Z axis. The shafts of the drive sources 601 are, for example, rotating shafts of motors. The feed screw shafts 602 are attached to the shafts of the drive sources 601. The drive sources 601 may be actuators provided with reducers, couplings, or the like. A coupling is a device that ensures axial tolerance.

A feed screw is formed on the +Z axis side of each of the feed screw shafts 602.

The feed screw shaft 602x of the driver 16x is located on the +Z axis direction side of the bottom surface on the −Y axis side of the base 17. The feed screw shaft 602y of the driver 16y is located on the +Z axis direction side of the side surface on the +X axis side of the base 17.

The feed screw shafts 602 are disposed parallel to the Z axis. The feed screws of the feed screw shafts 602 are inserted in female threads formed in the cam parts 603. The cam parts 603 are disposed so that the female threads are parallel to the Z axis.

As the shafts of the drive sources 601 rotate, the feed screw shafts 602 rotate. As the feed screw shafts 602 rotate, the cam parts 603 move in the Z axis direction due to the engagement of the screws. The cam parts 603 move in the Z axis direction due to the effect of the screws. The "effect of the screws" are the effect of converting rotational motion into linear motion.

The cam parts 603 include the cam bodies 604, cam grooves 605, and support shafts 606.

The cam grooves 605 are grooves that are provided in side surfaces of the cam bodies 604 and have depths. The cam grooves 605 each have a depth such that the X axis adjustment shaft 402 or Y axis adjustment shaft 403 does not collide with the back of the groove. Likewise, the shafts of the X axis adjustment shaft 402 or Y axis adjustment shaft 403 have lengths such that they do not come off the cam grooves 605.

The support shafts 606 are provided on surfaces on the −Z axis side of the cam bodies 604. The support shafts 606 are shafts extending from the surfaces on the −Z axis side of the cam bodies 604 in the −Z axis direction. The support shafts 606 are disposed parallel to the Z axis. The support shafts 606 are inserted in elongated holes 705 provided in the base 17.

The support shafts 606 have the function of preventing loads on the cam bodies 604 or vibrations transmitted to the cam bodies 604 from being directly transmitted to the feed screw shafts 602. The support shafts 606 also have the function of preventing the cam parts 603 from rotating about the Z axis. That is, the support shafts 606 constrain rotation of the cam parts 603 in the RZ direction.

The cam part 603x includes the cam grooves 605x. The cam grooves 605x each have a width having the same size as a diameter of the Y axis adjustment shaft 403 of the lens holder 14. Here, "the same size" refers to a size providing a gap that allows the Y axis adjustment shaft 403 to move in the cam grooves 605x. The cam grooves 605x is inclined to an XZ plane.

In FIG. 1, the −Z axis sides of the cam grooves 605x are located on the +Y axis side of the +Z axis sides of the cam grooves 605x. As the Y axis adjustment shaft 403 moves to the −Z axis sides of the cam grooves 605x along the cam grooves 605x, the Y axis adjustment shaft 403 moves in the +Y axis direction.

The lengths of the cam grooves 605x in the Z axis direction are greater than or equal to the distance by which the cam part 603x is moved by the feed screw shaft 602x in the Z axis direction. The lengths of the cam grooves 605x in the X axis direction are greater than or equal to the distance by which the lens holder 14 is moved in the X axis direction. The cam grooves 605x have depths such that the Y axis adjustment shaft 403 does not collide with the backs of the cam grooves 605x when the lens holder 14 is moved in the X axis direction. Likewise, the shafts of the Y axis adjustment shaft 403 have lengths such that they do not come off the cam grooves 605x.

When the Y axis adjustment shaft 403 is at centers of the cam grooves 605x in the Z axis direction, light with a light distribution pattern for when the vehicle travels straight is radiated.

When the Y axis adjustment shaft 403 is at the centers of the cam grooves 605x in the Z axis direction, the cam part 603x is non-intrusive with respect to a space bounded by the emitting surface of the optical unit 12 and the incident surface of the projection lens 13. Thus, when the Y axis adjustment shaft 403 is at the centers of the cam grooves 605x in the Z axis direction, the cam part 603x does not block light emitted from the optical unit 12.

Also, when the lens holder 14 is at its closest point to the cam part 603x, the cam part 603x is non-intrusive with respect to the space bounded by the emitting surface of the optical unit 12 and the incident surface of the projection lens 13. Also, when the lens holder 14 is at its farthest point to the cam part 603x, the cam part 603x is non-intrusive with respect to the space bounded by the emitting surface of the optical unit 12 and the incident surface of the projection lens 13. That is, when the Y axis adjustment shaft 403 is at ends of the cam grooves 605x in the Z axis direction, the cam part 603x does not block light emitted from the optical unit 12.

The cam part 603y includes the cam grooves 605y. The cam grooves 605y each have a width having the same size as a diameter of the X axis adjustment shaft 402 of the lens holder 14. Here, "the same size" refers to a size providing a gap that allows the X axis adjustment shaft 402 to move in the cam grooves 605y. The cam grooves 605y is inclined to a YZ plane.

In FIG. 1, the −Z axis sides of the cam grooves 605y are located on the −X axis side of the +Z axis sides of the cam grooves 605y. As the X axis adjustment shaft 402 moves to the −Z axis sides of the cam grooves 605y along the cam grooves 605y, the X axis adjustment shaft 402 moves in the −X axis direction.

The lengths of the cam grooves 605y in the Z axis direction are greater than or equal to the distance by which the cam part 603y is moved by the feed screw shaft 602y in the Z axis direction. The lengths of the cam grooves 605y in the Y axis direction are greater than or equal to the distance by which the lens holder 14 is moved in the Y axis direction. The cam grooves 605y have depths such that the X axis adjustment shaft 402 does not collide with the backs of the cam grooves 605y when the lens holder 14 is moved in the Y axis direction. Likewise, the shafts of the X axis adjustment shaft 402 have lengths such that they do not come off the cam grooves 605y.

When the X axis adjustment shaft 402 is at centers of the cam grooves 605y in the Z axis direction, light with the light distribution pattern for when the vehicle travels straight is radiated.

When the X axis adjustment shaft 402 is at the centers of the cam grooves 605y in the Z axis direction, the cam part 603y is non-intrusive with respect to the space bounded by the emitting surface of the optical unit 12 and the incident surface of the projection lens 13. Thus, when the X axis adjustment shaft 402 is at the centers of the cam grooves 605y in the Z axis direction, the cam part 603y does not block light emitted from the optical unit 12.

Also, when the lens holder 14 is at its closest point to the cam part 603y, the cam part 603y is non-intrusive with respect to the space bounded by the emitting surface of the optical unit 12 and the incident surface of the projection lens 13. Also, when the lens holder 14 is at its farthest point to the cam part 603y, the cam part 603y is non-intrusive with respect to the space bounded by the emitting surface of the optical unit 12 and the incident surface of the projection lens 13. That is, when the X axis adjustment shaft 402 is at ends of the cam grooves 605y in the Z axis direction, the cam part 603y does not block light emitted from the optical unit 12.

When the driver 16 moves the cam parts 603 in the Z axis direction using the drive sources 601 and feed screw shafts 602, it can move the position of the lens holder 14 on an XY plane. On the other hand, when the drive mechanism 16 does not move the positions of the cam parts 603, it can hold the position of the lens holder 14 on the XY plane.

Thus, when the driver 16 moves the cam parts 603 in the Z axis direction, it can move the position of the projection lens 13 on an XY plane. When the drive mechanism 16 does not move the positions of the cam parts 603, it can hold the position of the projection lens 13 on the XY plane.

The lens holder 14 is prevented by the cam part 603x from moving in the Y axis direction. This is because the cam part 603x holds the position of the Y axis adjustment shaft 403 of the lens holder 14. Also, the lens holder 14 is prevented by the cam part 603y from moving in the X axis direction. This is because the cam part 603y holds the position of the X axis adjustment shaft 402 of the lens holder 14.

Since each of the X axis adjustment shaft 402 and the Y axis adjustment shaft 403 includes the two pins, the cam parts 603x and 603y hold the position of the lens holder 14 in the RZ direction. The cam parts 603x and 603y can also hold the position of the lens holder 14 in the RX axis direction or RY axis direction.

<Base 17>

The base 17 will now be described with reference to FIG. 4.

The base 17 includes a base body 701. The base 17 may include female screw holes 703, a shaft hole 704y, and elongated holes 705y. Although not illustrated, a shaft hole 704x and elongated holes 705x are provided at a position corresponding to the cam part 603x of the base 17. Shaft holes 704 collectively represent the shaft holes 704x and 704y. The elongated holes 705 collectively represent the elongated holes 705x and 705y.

The base body 701 supports the optical unit 12. The base body 701 holds the optical unit 12. The base 17 supports the optical unit 12. The base 17 holds the optical unit 12.

The base body 701 supports the light source 11. The base body 701 holds the light source 11. The base 17 supports the light source 11. The base 17 holds the light source 11.

The female screw holes 703 are screw holes for fixing the holder 15 to the base body 701.

The base 17 includes the shaft hole 704x and elongated holes 705x with respect to the driver 16x. The base 17 includes the shaft hole 704y and elongated holes 705y with respect to the driver 16y. The shaft holes 704 hold the feed screw shafts 602 of the driver 16. The elongated holes 705 hold the support shafts 606 of the cam parts 603 of the driver 16. The feed screw shafts 602 pass through the shaft holes 704. The support shafts 606 pass through the elongated holes 705.

The base 17 may include bases to which the drive sources 601 are fixed.

<Operation of Headlight Module 1>

Figure 5:
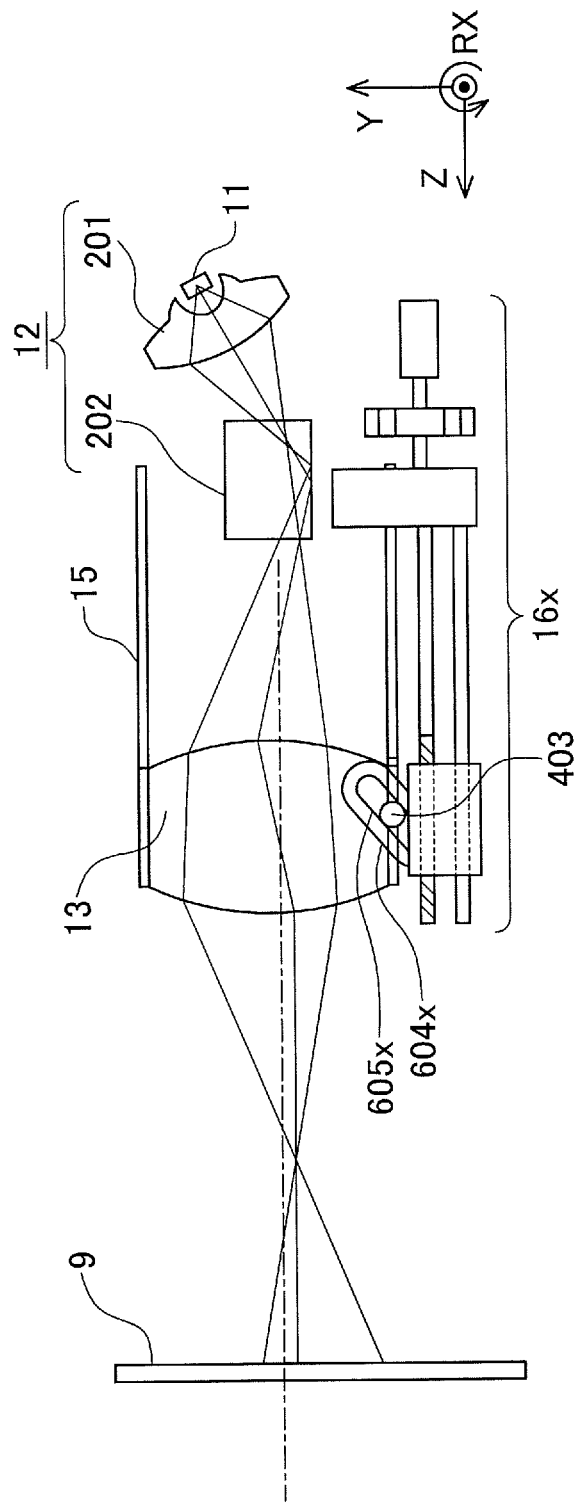
FIG. 5 is a diagram illustrating the operation of a drive device of the headlight module according to the first embodiment.
Figure 6:
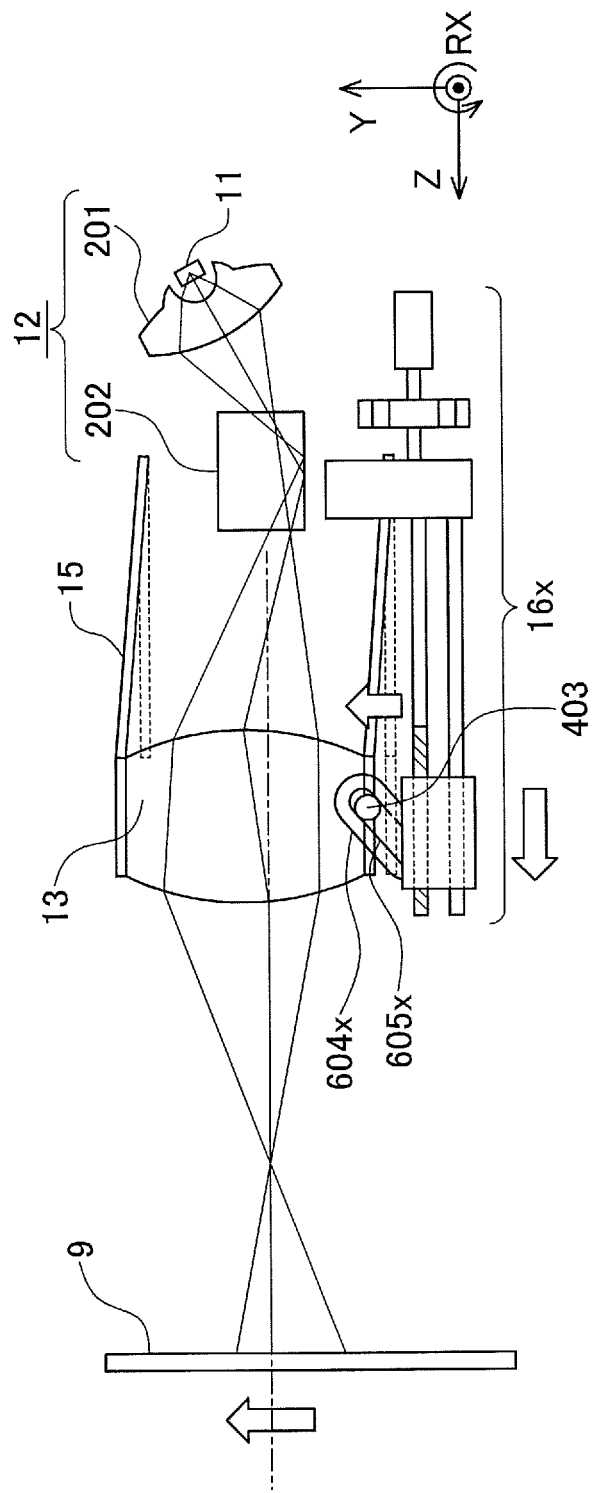
FIG. 6 is a diagram illustrating the operation of the drive device of the headlight module according to the first embodiment.

FIGS. 5 and 6 are diagrams illustrating the operation in the Y axis direction of a drive device of the headlight module 1. FIGS. 5 and 6 illustrate the operation of moving the projection lens 13 in the Y axis direction to move the light distribution of the headlight module 1. To simplify explanation, the headlight module 1 is illustrated by two-dimensional schematic diagrams on a YZ plane. The lens holder body 401 of the lens holder 14, X axis adjustment shaft 402, and female screw holes 404 are omitted.

FIG. 5 is a diagram when the projection lens 13 is located at a normal position. "Normal" refers to a case where light with the light distribution pattern for when the vehicle travels straight is radiated. Also, it refers to a case where no particularly heavy burden or the like is loaded on the vehicle. The attitude of the vehicle is horizontal. The "normal position" is also referred to as the "reference position".

Light emitted from the light source 11 is concentrated by the lens 201. In FIGS. 5 and 6, for example, the light is emitted from the light source 11 in a direction inclined in the −Y axis direction with respect to the +Z axis direction. The light emitted from the light source 11 is incident on the light guide member 202.

The light guide member 202 is a component for forming a light distribution pattern. A first part of the light incident on the light guide member 202 directly exits through the emitting surface of the light guide member 202. A second part of the light incident on the light guide member 202 is reflected by a side surface of the light guide member 202 and its traveling direction is changed to the +Y axis direction. In FIG. 5, the side surface at which the second part of the light is reflected is a side surface on the −Y axis direction side.

The light emitted from the optical unit 12 passes through the projection lens 13 and irradiates an XY plane (irradiated surface 9) located 10 m or more ahead in the +Z axis direction, for example.

The projection lens 13 is prevented by the holder 15 from moving in the Z axis direction and rotating in the RX axis direction. The projection lens 13 is positioned in the Y axis direction by the cam grooves 605x of the driver 16x and the Y axis adjustment shaft 403 of the lens holder 14. The projection lens 13 moves in the Y axis direction in accordance with movement of the cam body 604x of the driver 16x in the Z axis direction.

FIG. 6 is a diagram when the projection lens 13 is shifted by the driver 16x in the +Y axis direction from the normal position. The behavior and the like of light after being emitted from the light source 11 and before being emitted from the optical unit 12 are the same as those in FIG. 5, so description thereof will be omitted. The behavior and the like of light from the light source 11 to the emitting surface of the optical unit 12 are the same as those in FIG. 5.

The cam body 604x of the driver 16x is shifted in the +Z axis direction from its position in FIG. 5. Thereby, the Y axis adjustment shaft 403 shifts in the +Y axis direction while being guided by the cam grooves 605x. When the Y axis adjustment shaft 403 shifts in the +Y axis direction, the projection lens 13 also shifts in the +Y axis direction. The position of the projection lens 13 on which the light emitted from the optical unit 12 is incident is shifted in the −Y axis direction from that in FIG. 5. In this case, an image on the irradiated surface 9 shifts in the +Y axis direction from its position in FIG. 5.

That is, by shifting the projection lens 13 in the Y axis direction, the light distribution on the irradiated surface 9 is shifted in the Y axis direction. For example, in the case of the headlight module 1 of the first embodiment, to correct a shift amount of the optical axis of the projection lens 13 at a position 25 m ahead caused when the vehicle tilts forward by 5 degrees, it is only required that the projection lens 13 is shifted by 1.5 to 2 mm in the +Y axis direction. To correct a shift amount of the light distribution at a position 25 m ahead caused when the vehicle tilts forward by 5 degrees, it is only required that the projection lens 13 is shifted by 1.5 to 2 mm in the +Y axis direction.

As described with FIGS. 5 and 6, when the cam part 603x shifts in the +Z axis direction, the Y axis adjustment shaft 403 shifts in the +Y axis direction. When the Y axis adjustment shaft 403 shifts in the +Y axis direction, the lens holder 14 shifts in the +Y axis direction. In this case, the lens holder 14 is prevented by the holder 15 from moving in the X axis direction and Z axis direction. The light distribution on the irradiated surface 9 is shifted in the +Y axis direction.

On the other hand, although not illustrated, when the cam part 603x shifts in the −Z axis direction, the Y axis adjustment shaft 403 shifts in the −Y axis direction. When the Y axis adjustment shaft 403 shifts in the −Y axis direction, the lens holder 14 shifts in the −Y axis direction. Also in this case, the lens holder 14 is prevented by the holder 15 from moving in the X axis direction and Z axis direction. The light distribution on the irradiated surface 9 is shifted in the −Y axis direction.

The cam part 603y operates similarly to the cam part 603x.

Figure 7:
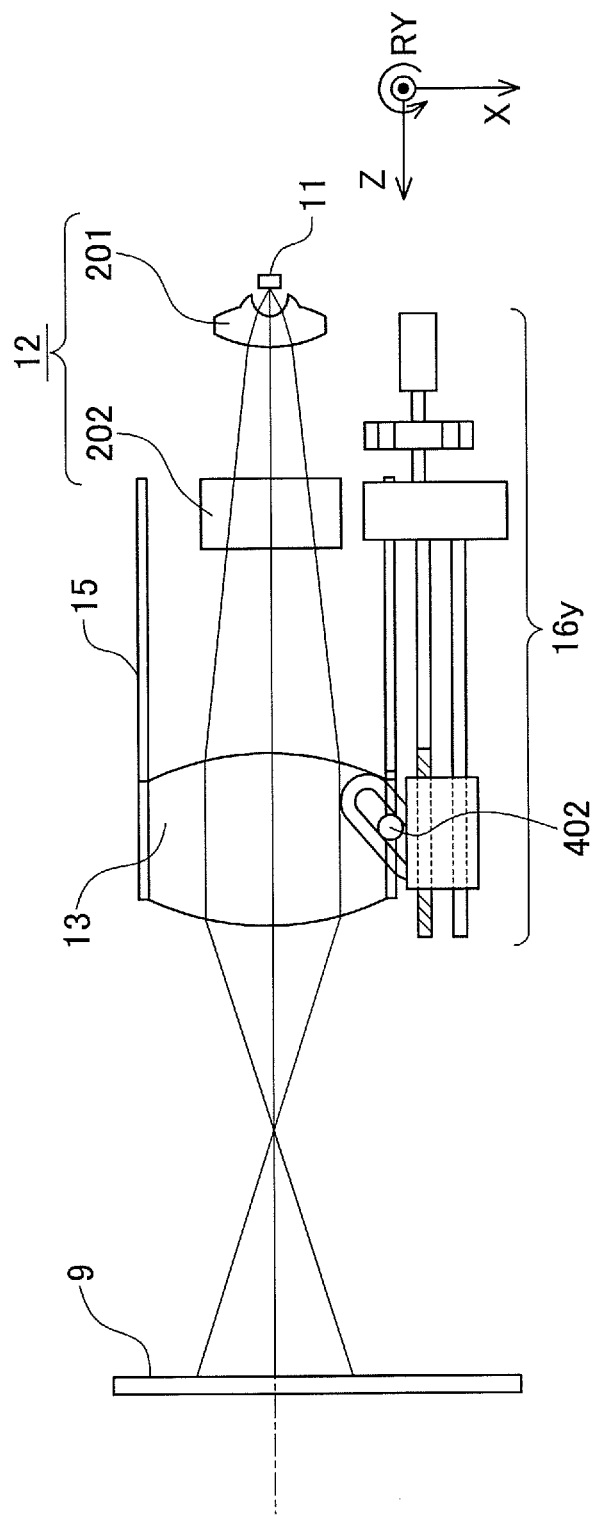
FIG. 7 is a diagram illustrating the operation of the drive device of the headlight module according to the first embodiment.
Figure 8:
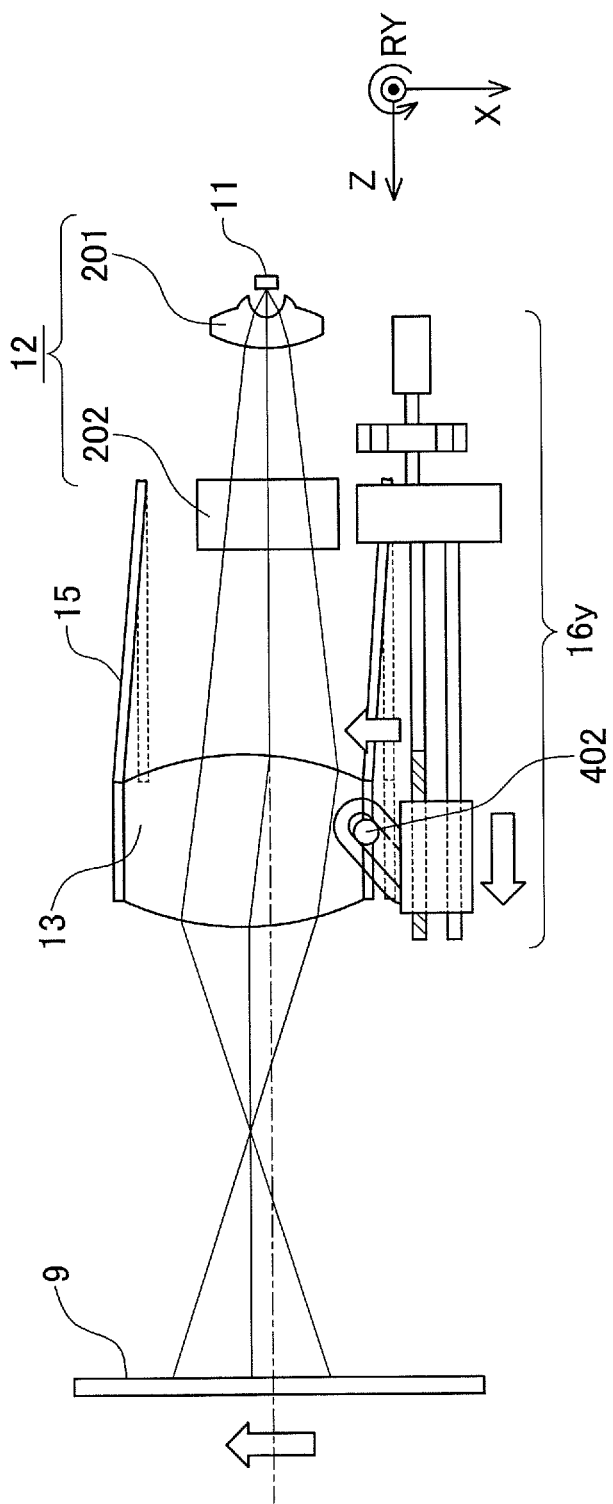
FIG. 8 is a diagram illustrating the operation of the drive device of the headlight module according to the first embodiment.

FIGS. 7 and 8 are diagrams illustrating the operation in the X axis direction of the drive device of the headlight module 1. FIGS. 7 and 8 illustrate the operation of moving the projection lens 13 in the X axis direction to move the light distribution of the headlight module 1. To simplify explanation, the headlight module 1 is illustrated by two-dimensional schematic diagrams on a ZX plane. The lens holder body 401 of the lens holder 14, Y axis adjustment shaft 403, and female screw holes 404 are omitted.

FIG. 7 illustrates a case where the projection lens 13 is located at the normal position. FIG. 8 illustrates a state where the projection lens 13 is shifted by the driver 16y in the −X axis direction.

As illustrated in FIG. 8, when the cam part 603y shifts in the +Z axis direction, the X axis adjustment shaft 402 shift in the −X axis direction. When the X axis adjustment shaft 402 shifts in the −X axis direction, the lens holder 14 shifts in the −X axis direction. In this case, the lens holder 14 is prevented by the holder 15 from moving in the Y axis direction and Z axis direction. The light distribution on the irradiated surface 9 is shifted in the −X axis direction.

On the other hand, although not illustrated, when the cam part 603y shifts in the −Z axis direction, the X axis adjustment shaft 402 shifts in the +X axis direction. When the X axis adjustment shaft 402 shifts in the +X axis direction, the lens holder 14 shifts in the +X axis direction. Also in this case, the lens holder 14 is prevented by the holder 15 from moving in the Y axis direction and Z axis direction. The light distribution on the irradiated surface 9 is shifted in the +X axis direction.

As above, the position of the light distribution on the irradiated surface 9 of the headlight module 1 is determined by the position of the lens holder 14 relative to the optical unit 12.

As described above, the lens holder 14 is held by the holder 15 and thereby supported movably in multiple directions with respect to a plane (XY plane) perpendicular to a light traveling direction (the Z axis direction). That is, the lens holder 14 is supported by the holder 15 movably in the multiple directions on the plane (XY plane) perpendicular to the light traveling direction (Z axis direction). In the first embodiment, the holder 15 is, for example, parallel springs. The "multiple directions" are the X axis direction and Y axis direction, in the first embodiment.

The position of the lens holder 14 on an XY plane is determined by the X axis adjustment shaft 402, Y axis adjustment shaft 403, and drivers 16x and 16y. In the first embodiment, the drivers 16x and 16y are, for example, cam mechanisms. The position of the lens holder 14 on the XY plane is determined by the X axis adjustment shaft 402, Y axis adjustment shaft 403, and cam grooves 605x and 605y.

The headlight module 1 of the first embodiment can move the projection lens 13 held by the lens holder 14 parallel to the XY plane, by means of the holder 15 and driver 16. A link mechanism or the like may also be used in the drivers 16x and 16y.

For example, when a structure movable in multiple directions is provided by using a guide shaft or the like, performance degradation, such as abrasion of a sliding surface due to vibration of a vehicle or fixation between sliding surfaces due to thermal deformation, is problematic. Performance degradation in sliding surfaces is problematic.

In particular, optical components, such as the projection lens 13, require positioning accuracy. Thus, a sliding measure is applied to a movable portion and enlarges the movable portion. It has been difficult to develop a device that controls a light distribution appropriate for the headlight module 1 while aiming at downsizing.

By using the holder 15 including the parallel springs 15a and 15b, the headlight module 1 can move the projection lens 13 parallel to the XY plane without a sliding portion.

The holder 15 of the first embodiment constrains the rotation in the RX axis direction, RY axis direction, and RZ direction by means of the pair of plate springs 15a and 15b as parallel springs. In the first embodiment, the pair of plate springs is described as an example of the holders 15a and 15b.

The holders 15 independently has degrees of freedom for translational movement in the X axis direction and Y axis direction of the projection lens 13 and lens holder 14. The holder 15 allows the projection lens 13 and lens holder 14 to translate in the X axis direction or Y axis direction. "Translational movement" refers to parallel displacement of each point constituting a rigid body or the like in the same direction. The lens holder 14 can move freely on the XY plane while keeping the optical axis of the projection lens 13 parallel to the Z axis.

<Headlight 95>

The downsized headlight module 1 as above is modularized and used as a headlight. A headlight for a vehicle may include multiple headlight modules and superpose light distributions of the respective headlight modules to form the aforementioned light distribution pattern. A headlight may be provided with multiple lights by modularization. A headlight provided with multiple lights can form a light distribution pattern more suitable for driving by a driver. Headlights provided with multiple lights are becoming popular in terms of design or efficiency.

Figure 9:
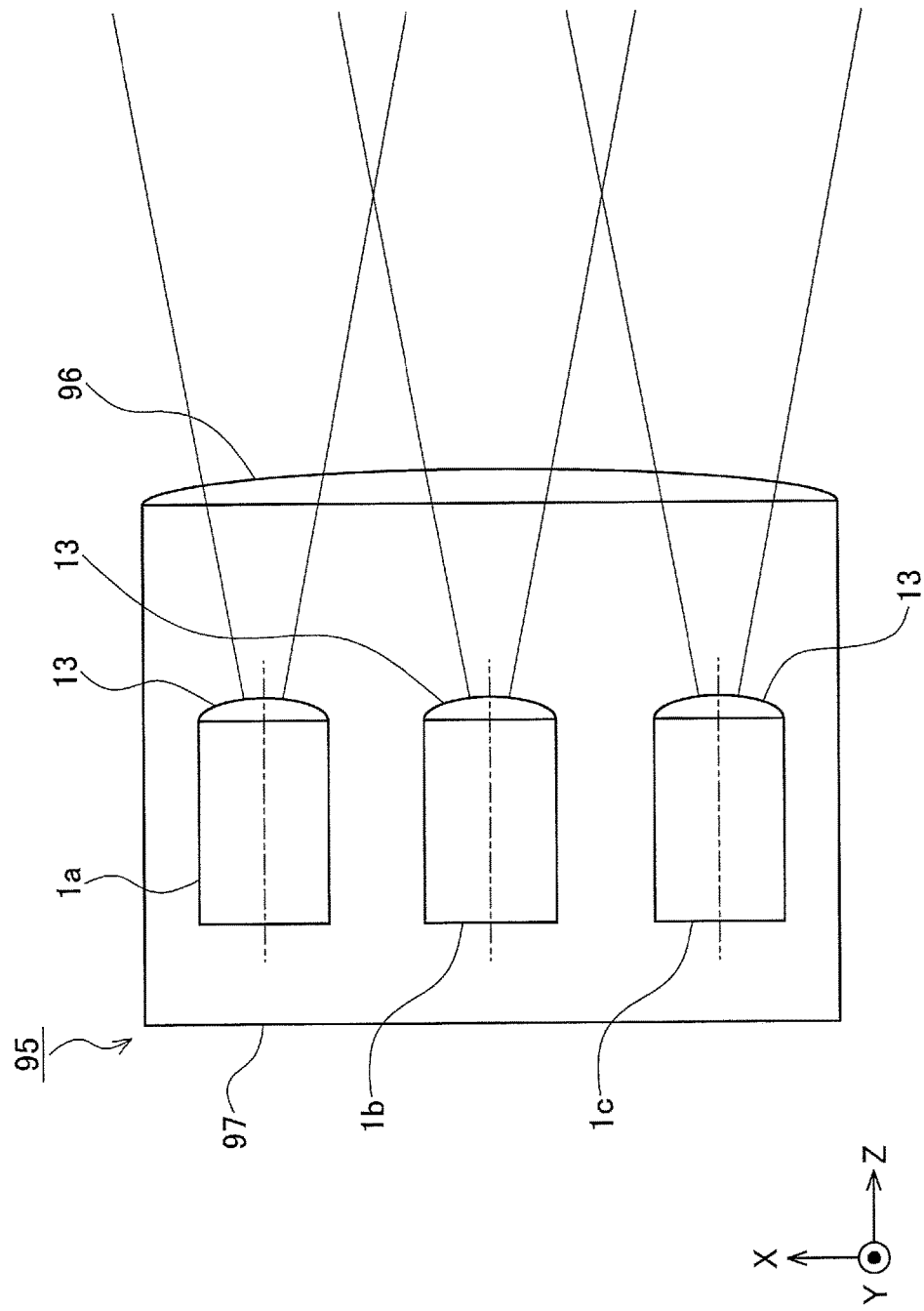
FIG. 9 is a configuration diagram of a headlight according to the first embodiment.

FIG. 9 is a configuration diagram illustrating a configuration of a headlight 95 on which headlight modules 1a, 1b, and 1c are mounted. The headlight 95 includes a cover 96 and a housing 97. The cover 96 is made of transparent material. The housing 97 is disposed inside a vehicle body. The cover 96 is disposed at a surface part of the vehicle body and exposed on the outside of the vehicle body. The cover 96 is disposed on the +Z axis direction side (in the front) of the housing 97.

The headlight modules 1a, 1b, and 1c are housed in the housing 97. In FIG. 9, as an example, the three headlight modules 1a, 1b, and 1c are housed. The number of headlight modules 1 used in the headlight is not limited to three. The number of headlight modules 1 may be one or three or more.

The headlight modules 1a, 1b, and 1c are arranged in the X axis direction in the housing 97. The headlight modules 1a, 1b, and 1c need not necessarily be arranged in the X axis direction and may be arranged in other ways. In view of the design, function, or the like, the headlight modules 1a, 1b, and 1c may be arranged so that they are displaced from each other in the Y axis direction or Z axis direction.

Light emitted from the headlight modules 1a, 1b, and 1c passes through the cover 96 and is emitted ahead of the vehicle. In FIG. 9, light emitted from the cover 96 is superposed with light emitted from the adjacent headlight modules 1a, 1b, and 1c to form a single light distribution, pattern.

The cover 96 is provided to protect the headlight modules 1a, 1b, and 1c from rain, wind, dust, or the like. The cover 96 prevents rain, wind, dust, or the like from entering the housing 97. However, if the projection lens 13 is configured to protect components inside the headlight modules 1a, 1b, and 1c from rain, wind, dust, or the like, there is no need to provide the cover 96.

In FIG. 9, the housing 97 houses the headlight modules 1a, 1b, and 1c. However, the housing 97 need not have a box shape. The housing 97 may consist of a frame or the like and have a configuration in which the headlight modules 1a, 1b, and 1c are fixed to the frame.

Figure 10:
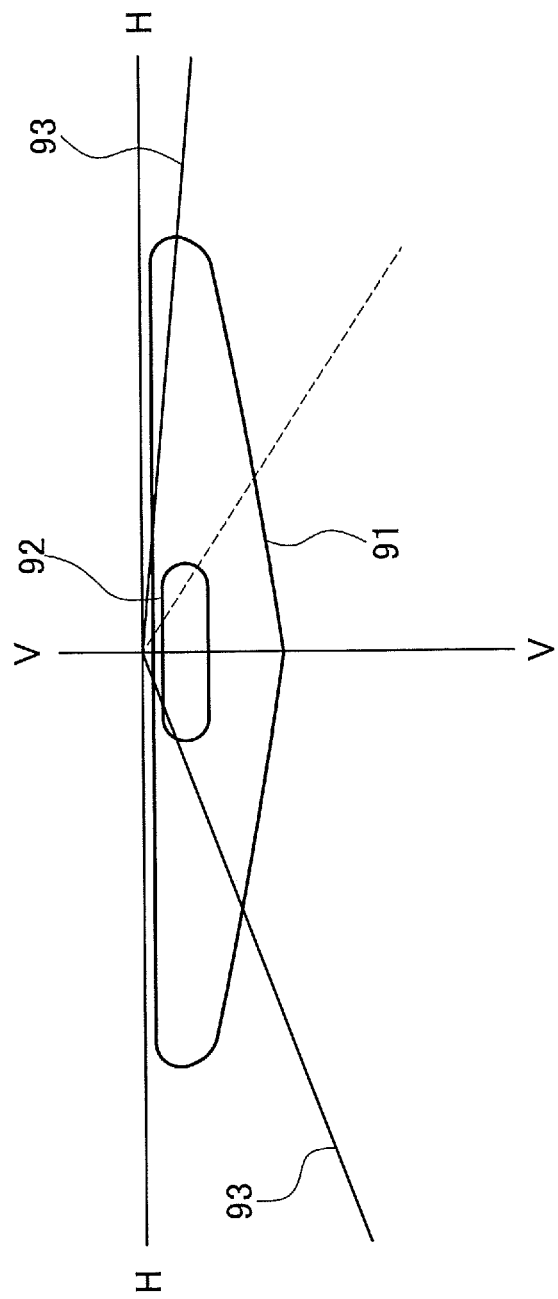
FIG. 10 is a diagram illustrating a light distribution of the headlight according to the first embodiment.

FIG. 10 is a schematic diagram illustrating irradiation regions 91 and 92 on the irradiated surface 9 irradiated by the headlight modules 1a, 1b, and 1c. The line V-V represents a vertical line at a position of the vehicle. The line H-H represents a horizontal line at the position of the vehicle. In FIG. 10, the vehicle travels in a left lane. The reference character 93 represents edges of the road.

In FIG. 10, for example, the line V-V is perpendicular to the road surface. The line H-H is parallel to the road surface.

In FIG. 10, the irradiation region 91 illuminates a wide area in front of the vehicle. The irradiation region 91 is horizontally long and vertically short. The irradiation region 91 includes a part toward which the vehicle is traveling, sides of the road, and a part in which oncoming vehicles exist. The irradiation region 91 is the entire region of the light distribution pattern of the headlight 95.

On the other hand, the irradiation region 92 illuminates a central narrow area in front of the vehicle. The irradiation region 91 is horizontally long and vertically short. The irradiation region 92 includes a part toward which the vehicle is traveling. The irradiation region 92 is a high illuminance region in the light distribution pattern of the headlight 95.

The irradiation regions 91 and 92 are light distribution patterns of the respective headlight modules 1a, 1b, and 1c. For example, the headlight modules 1a and 1c irradiate the irradiation region 91 by arranging the two light distribution patterns. The headlight module 1b irradiates the irradiation region 92.

As can be seen from FIG. 10, the headlight module 1b irradiates the irradiation region 92 just beneath a cutoff line, around a center of the light distribution pattern, and on the irradiated surface 9. This portion is required to have the highest illuminance in the irradiation region. On the other hand, the headlight modules 1a and 1c irradiate the wide irradiation region 91 on the irradiated surface 9.

The emitting surface of the light guide member 202 of the headlight module 1b has, for example, a rectangular shape with a height of 1.0 mm (in the Y axis direction) and a width of 3.0 mm (in the X axis direction). The emitting surfaces of the light guide members 202 of the headlight modules 1a and 1c each have, for example, a rectangular shape with a height of 2.0 mm and a width of 15.0 mm.

The projection lenses 13 of the headlight modules 1a, 1b, and 1c are the same. Thus, if the distances from the emitting surfaces of the light guide members 202 to the projection lenses 13 are equal, the magnifications of projection onto the irradiated surface 9 are equal. Thus, the irradiated surface 9 is irradiated while the area ratio and luminance ratio between the emitting surface of the light guide member 202 of the headlight module 1b and the emitting surfaces of the light guide members 202 of the headlight modules 1a and 1c are maintained on the irradiated surface 9. The area ratio and luminance ratio between the emitting surfaces of the light guide members 202 are magnified and radiated onto the irradiated surface 9.

If the outputs of light from the light sources 11 of the headlight modules 1a, 1b, and 1c are equal, the illuminance per unit area on the irradiated surface 9 of the headlight module 1b is higher than those of the headlight modules 1a and 1c. This is because the area of the emitting surface of the vehicle headlight module 1b is less than the areas of the emitting surfaces of the headlight modules 1a and 1c.

The headlight module 1b irradiates the irradiation region 92 just beneath the cutoff line, at a center of the light distribution pattern, and on the irradiated surface 9. The headlight module 1b irradiates a part that is required to have the highest illuminance. The headlight modules 1a and 1c irradiate the wide irradiation region 91 on the irradiated surface 9. The headlight modules 1a and 1c effectively illuminate a wide region on the irradiated surface 9 at a generally low illuminance.

In this manner, the headlight 95 uses the multiple headlight modules 1a, 1b, and 1c, and adds their respective light distribution patterns to form a desired light distribution pattern. "Desired" here refers to, for example, satisfying road traffic rules or the like.

Optical components other than the light guide members 202 can be made common between the headlight modules 1a, 1b, and 1c. In the past, the optical system has been optimally designed for each headlight module. Thus, it has been difficult to make optical components common. In the headlight 95 according to the first embodiment, optical components other than the light guide members 202 can be made common between the headlight modules 1a, 1b, and 1c. This is because the light distribution pattern can be formed by at least the shapes of the light guide members 202. Thus, only by replacing the light guide member 202, different light distribution patterns can be formed.

Thus, the headlight 95 allows the number of types of optical components to be reduced. Further, the headlight 95 allows management of the optical components to be facilitated. Thus, the headlight 95 allows its manufacturing cost to be reduced.

The irradiation region 92 irradiated with light emitted from the headlight module 1b can be moved in the horizontal direction by moving the projection lens 13 in the left-right direction (X axis direction) relative to the light guide member 202.

That is, the high illuminance region in the light distribution pattern can be moved in the horizontal direction by moving the projection lens 13 in the left-right direction (X axis direction) relative to the light guide member 202. The light guide member 202 is static relative to the light source 11. Thus, the high illuminance region in the light distribution pattern can be moved in the horizontal direction by moving the projection lens 13 in the left-right direction (X axis direction) relative to the light source 11.

This makes it possible to increase illuminance in a region that a driver is watching while traveling in a curve.

The headlight module 1 can suppress increase in size of a structure capable of moving a light distribution in the up-down direction or left-right direction.

Embodiments described above or below may use terms, such as "parallel" or "perpendicular", indicating the positional relationships between parts or the shapes of parts. These terms are intended to include ranges taking account of manufacturing tolerances, assembly variations, or the like. Thus, recitations in the claims indicating the positional relationships between parts or the shapes of parts are intended to include ranges taking account of manufacturing tolerances, assembly variations, or the like.

Second Embodiment

In a second embodiment, a part of the driver 16x and a part of the driver 16y described in the first embodiment are integrated. By integrating a part of the driver 16x and a part of the driver 16y described in the first embodiment, it is possible to further suppress increase in size of a structure capable of moving a light distribution of a headlight module in the up-down direction or left-right direction.

Figure 11:
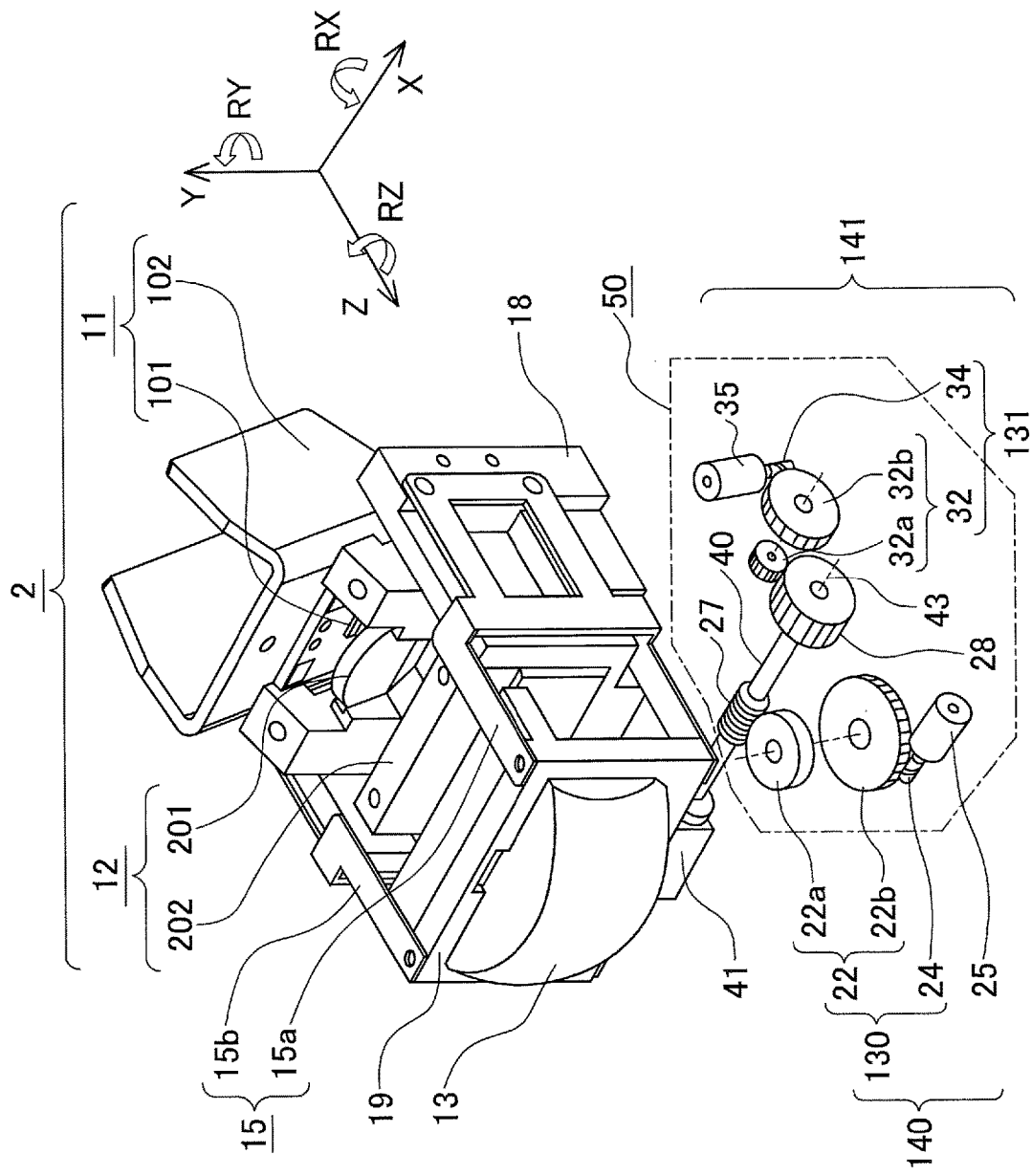
FIG. 11 is a perspective view of a headlight module according to a second embodiment.
Figure 12:
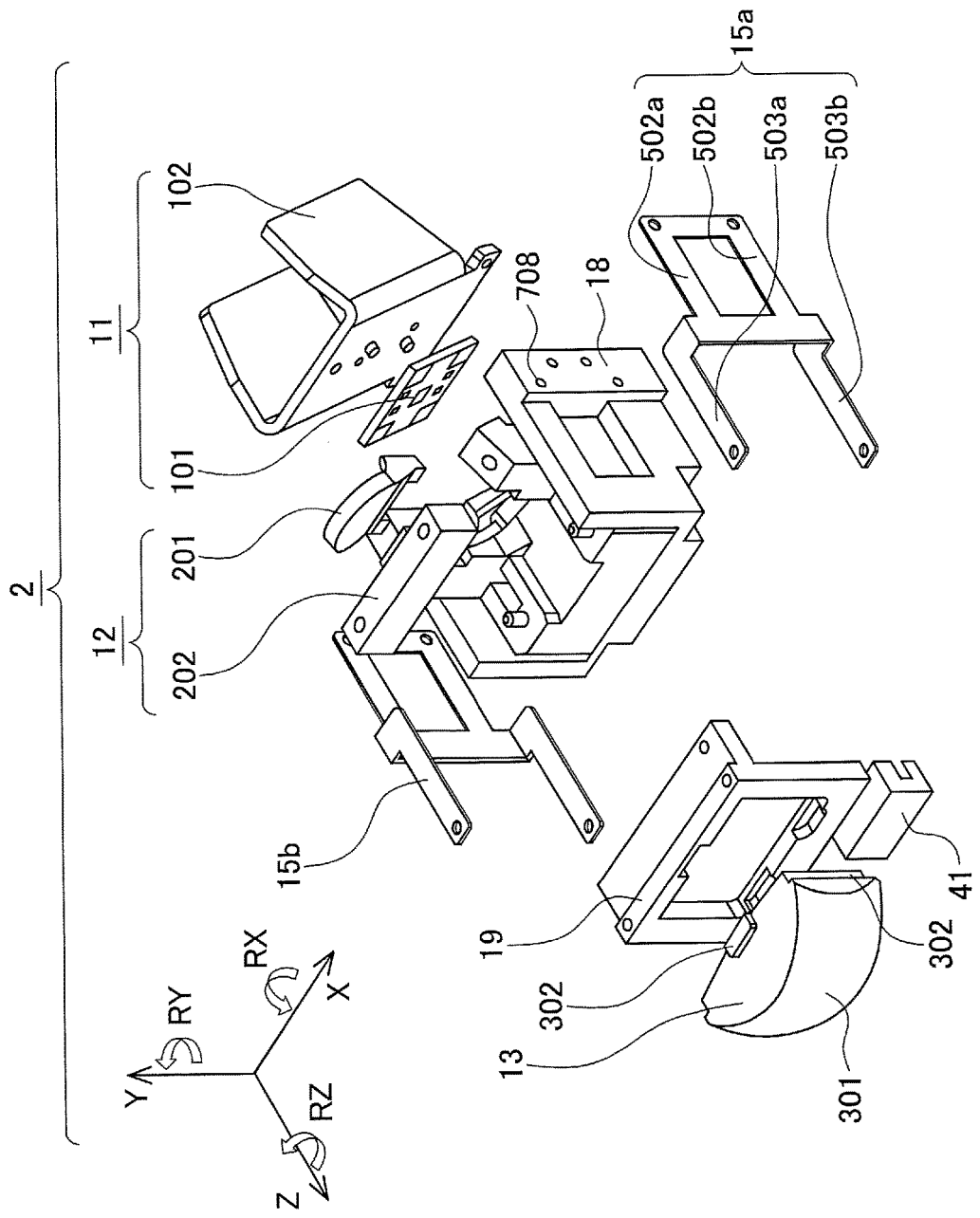
FIG. 12 is an exploded perspective view of the headlight module according to the second embodiment.

FIG. 11 is a perspective view of a headlight module 2 according to the second embodiment. FIG. 12 is an exploded perspective view of the headlight module 2 according to the second embodiment, except a part thereof.

As illustrated in FIG. 11, the headlight module 2 according to the second embodiment includes a light source 11, a projection lens 13, a holder 15, an adjusting shaft 40, and a driver 50. The headlight module 2 may include a base 18, an optical unit 12, and a lens holder 19.

The light source 11 is fixed to the base 18. The optical unit 12 is fixed to the base 18. The projection lens 13 receives light emitted from the optical unit 12 and emits it to the opposite side. The projection lens 13 is fixed to the lens holder 19. The holder 15 holds the lens holder 19 on the base 18. The adjusting shaft 40 moves the lens holder 19 on a plane (X-Y plane in FIG. 11) perpendicular to an optical axis of the projection lens 13. The driver 50 drives the adjusting shaft 40. The projection lens 13 receives light emitted from the light source 11 as incident light and emits the incident light ahead of a vehicle as projection light.

In the following description, the adjusting shaft 40 is distinguished from the driver 50, but the adjusting shaft 40 is included in the driver 50. That is, the driver 50 includes the adjusting shaft 40.

Similarly to the headlight module 1 according to the first embodiment, the headlight module 2 according to the second embodiment includes the light source 11, optical unit 12, projection lens 13, holder 15, and driver 50 (including the adjusting shaft 40). The headlight module 2 may include the lens holder 19 and base 18.

The second embodiment differs from the first embodiment in a mechanism for driving the lens holder 19, to which the projection lens 13 is fixed. The second embodiment differs from the first embodiment in that it uses the driver 50 instead of the driver 16 in the first embodiment and uses the adjusting shaft 40.

The headlight module 2 is obtained by replacing the driver 16 of the headlight module 1 with the driver 50. The lens holder 19 differs in structure from the lens holder 14. Further, the headlight module 2 includes a projection lens side connection member 41. Otherwise, the elements of the headlight module 2 are the same as those of the headlight module 1.

Depending on the configuration of the driver 50, the configurations of the lens holder 19, base 18, and driver 50 partially differ from the configurations of the lens holder 14, base 17, and driver 16 described in the first embodiment. However, otherwise, the configurations are the same as those of the first embodiment. In the second embodiment, elements having the same reference characters as those of the first embodiment are the same as those of the first embodiment, so description thereof will be omitted.

The elements of the headlight module 2 that are the same as those of the headlight module 1 are the light source 11 (an LED light source 101 and a heat dissipation unit 102), optical unit 12 (a lens 201 and a light guide member 202), projection lens 13, and holder 15 (parallel springs 15a and 15b). The parallel springs 15a and 15b are an example of holders.

<Lens Holder 19>

When the lens holder 19 is described corresponding to the lens holder 14, the lens holder 19 includes a lens holder body and fitting portions 405. However, in the following description, the lens holder body is described as the lens holder 19. Thus, the lens holder 19 includes the fitting portions 405.

The lens holder 19 is a component that holds the projection lens 13.

The lens holder 19 has a frame shape.

The projection lens side connection member 41 is fixed to the −Y axis direction side of the lens holder 19. The projection lens side connection member 41 is connected to the rotating shaft 40. The projection lens side connection member 41 may be formed integrally with the lens holder 19. The projection lens side connection member 41 may also be formed directly on the projection lens 13.

Movement of the adjusting shaft 40 moves the projection lens side Connection member 41. This moves the projection lens 13 fixed to the lens holder 19. The lens holder 19 is attached to the base 18 through the holder 15.

As described later, the adjusting shaft 40 is moved in the X axis direction by rotation of a small gear 22a. Also, the adjusting shaft 40 is rotated in the RX axis direction by rotation of a small gear 32a.

As described in the first embodiment, the holder 15 includes the holders 15a and 15b as plate springs. The holder 15 allows the lens holder 19 to move in the X axis direction or Y axis direction relative to the base 18.

The projection lens 13 is held by the lens holder 19. The light source 11 is held by the base 18. Thus, the holder 15 allows the projection lens 13 to move in the X axis direction or Y axis direction relative to the light source 11.

<Base 18>

As illustrated in FIG. 12, female screw holes 708 for fixing the holder 15 with screws or the like are provided in the −Z axis direction sides of surfaces (side surfaces parallel to a YZ plane) perpendicular to the X axis of the base 18. The optical unit 12 is fixed to an upper portion (the +Y axis direction side) of the base 18, and the light source 11 is fixed on the −Z axis direction side of the optical unit 12.

Some of the female screw holes 708 are provided in the −Z axis side of a side surface on the +X axis side of the base 18. Likewise, the others of the female screw holes 708 are provided in the −Z axis side of a side surface on the −X axis side of the base 18. The female screw holes 708 are the same as the female screw holes 703 of the base 17. The side surfaces on the +X axis side and −X axis side of the base 18 are, for example, surfaces perpendicular to the X axis.

The light source 11 and optical unit 12 are mounted on the base 18. The light source 11 and optical unit 12 are mounted on the base 18 in the same manner as the base 17 of the first embodiment.

The base 18 of the second embodiment has a configuration obtained by omitting the shaft holes 704 and elongated holes 705 from the base 17 of the first embodiment.

<Adjusting Shaft 40>

Figure 13:
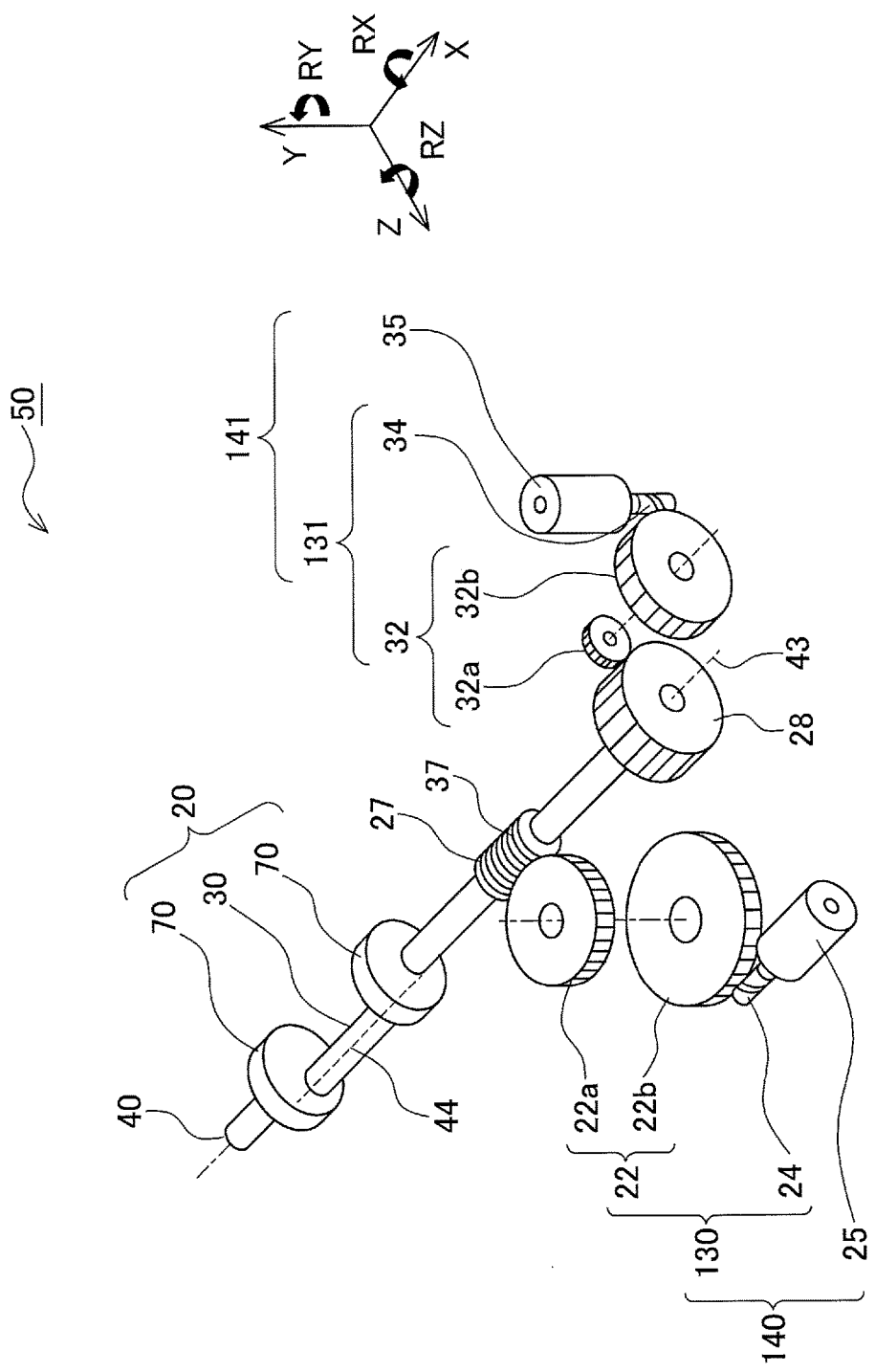
FIG. 13 is a diagram of components of the headlight module according to the second embodiment.
Figure 14:
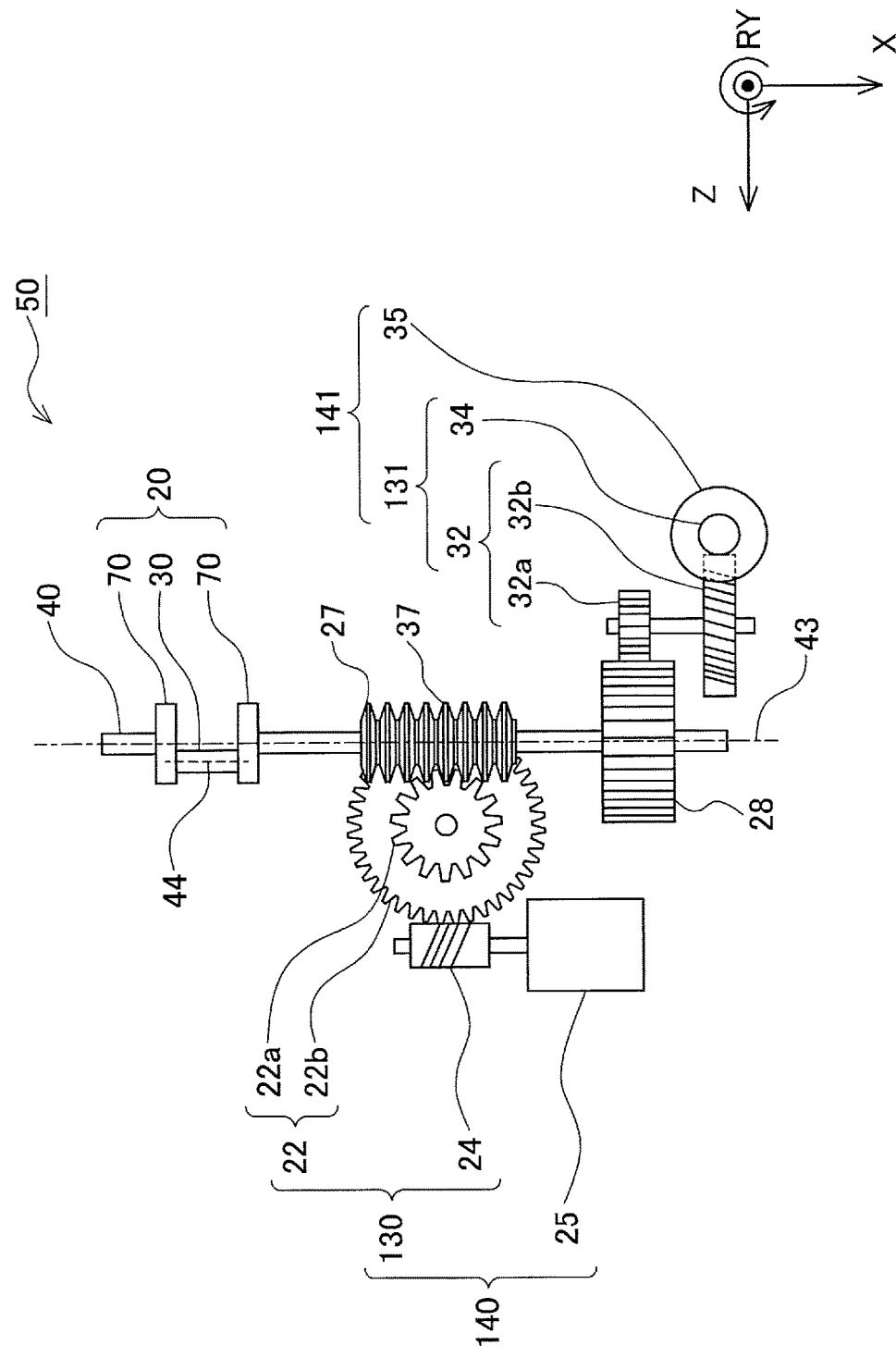
FIG. 14 is a diagram of components of the headlight module according to the second embodiment.

FIG. 13 is a perspective view illustrating configurations of the adjusting shaft 40 and driver 50 illustrated in FIG. 11. FIG. 14 is a top view illustrating the adjusting shaft 40 and driver 50 illustrated in FIG. 13. FIG. 14 is a view of the adjusting shaft 40 and driver 50 illustrated in FIG. 11, as viewed from the +Y axis direction side.

As illustrated in FIG. 13, the adjusting shaft 40 includes a first drive transmission portion 27 and a second drive transmission portion 28. A driving force from the driver 50 is transmitted to the first drive transmission portion 27. Driving force from a first driver 140 is transmitted to the first drive transmission portion 27. Another driving force from the driver 50 is transmitted to the second drive transmission portion 28. Driving force from a second driver 141 is transmitted to the second drive transmission portion 28.

The first drive transmission portion 27 forms a rack having a concavo-convex shape 37 in a direction of a central axis (rotational axis) 43 of the adjusting shaft 40. The central axis 43 is an axis about which the adjusting shaft 40 rotates. Unlike a typical rack, the concavo-convex shape 37 is not spiral in the direction of the central axis 43 of the adjusting shaft 40, and concavity and convexity in the form of a gear is symmetrically formed over the entire circumference about the central axis 43.

Unlike a typical rack, in the concavo-convex shape 37, a concavo-convex shape is formed over the entire circumference of the adjusting shaft 40. Also, unlike a male screw with a spiral groove, grooves of the concavo-convex shape 37 is each provided over the entire circumference of the adjusting shaft 40 at the same position in the direction of the central axis 43 of the adjusting shaft 40. The grooves of the concavo-convex shape 37 have the same shape on a plane passing through the central axis 43. The concavo-convex shape 37 is a shape of a solid of revolution about the central axis 43. The concavo-convex shape 37 is, for example, in the form of teeth of a gear.

In FIG. 14, when viewed on a ZX plane, the small gear 22a and concavo-convex shape 37 constitute a rack and pinion mechanism. "Rack and pinion" refers to a mechanism that converts rotational force into linear motion. It is a combination of a circular gear with a small diameter called a pinion and a rack that is a plate-like rod subjected to gear cutting (provided with teeth). When rotational force is applied to the pinion, the rack moves in the horizontal direction.

Because of the above-described shape of the grooves of the concavo-convex shape 37, rotation of the adjusting shaft 40 about the central axis 43 does not rotate the small gear 22a.

The adjusting shaft 40 moves in the direction (X axis direction) of the central axis 43 (indicated by a dot-and-dash line in FIG. 13) of the adjusting shaft 40 and rotates about the central axis 43. The motion of the adjusting shaft will be described later in detail.

The adjusting shaft 40 includes a connection portion 20.

The connection portion 20 is connected to the projection lens side connection member 41. The projection lens side connection member 41 is, for example, attached to the lens holder 19.

The connection portion 20 includes first engagement portions 70 and an eccentric portion 30. The first engagement portions 70 engage with the projection lens side connection member 41 in the direction of the central axis 43 of the adjusting shaft 40. "Engage" refers to linking an element and another element to each other.

The eccentric portion 30 has a central axis 44 (indicated by a dashed line in FIG. 13) at a position different from that of the central axis 43 of the adjusting shaft 40. The central axes 43 and 44 are parallel to each other. As the adjusting shaft 40 rotates, the eccentric portion 30 rotates about the central axis 43. A radius of rotation of the eccentric portion 30 is the amount of eccentricity between the central axes 43 and 44.

In the second embodiment, the adjusting shaft 40 includes, on both sides of the eccentric portion 30 in the X axis direction, the first engagement portions (flange portions) 70. The first engagement portions 70 are disk-shaped and have diameters greater than that of the adjusting shaft 40. "Disk" refers to a round, flat object. The first engagement portions 70 are means for limiting a movable range of the adjusting shaft 40 in the direction of the central axis 43.
<Driver 50>

The driver 50 drives the adjusting shaft 40. The driver 50 includes the first driver 140 and second driver 141. The first driver 140 drives the adjusting shaft 40 in the X axis direction. The second driver 141 drives and rotates the adjusting shaft 40 about the central axis 43 extending in the X axis direction.

As illustrated in FIGS. 13 and 14, the first driver 140 includes a first motor 25 and a first reducer 130. The first reducer 130 transmits driving force of the first motor 25 to the adjusting shaft 40. The first reducer 130 adjusts the driving force of the first motor 25.

The first reducer 130 includes a first worm gear 24 and a double gear 22. The first worm gear 24 is fixed to a rotating shaft of the motor 25. The double gear 22 transmits driving force of the first worm gear 24 to the adjusting shaft 40.

The double gear 22 includes a large gear 22b and the small gear 22a. The large gear 22b meshes with the first worm gear 24. The small gear 22a is in contact with the first drive transmission portion 27 of the adjusting shaft 40. The small gear 22a meshes with the first drive transmission portion 27 of the adjusting shaft 40. Although not illustrated, in the double gear 22, the large gear 22b and small gear 22a have a common rotating shaft. The small gear 22a is integrated with the large gear 22b in the rotational direction.

The second driver 141 includes a second motor 35 and a second reducer 131. The second reducer 131 transmits driving force of the second motor 35 to the adjusting shaft 40. The second reducer 131 adjusts the driving force of the second motor 35.

The second reducer 131 includes a second worm gear 34 and a double gear 32. The second worm gear 34 is fixed to a rotating shaft of the motor 35. The double gear 32 transmits driving force of the second worm gear 34 to the adjusting shaft 40.

The double gear 32 includes a large gear 32b and the small gear 32a. The large gear 32b meshes with the second worm gear 34. The small gear 32a is in contact with the second drive transmission portion 28 of the adjusting shaft 40. The small gear 32a meshes with the second drive transmission portion 28 of the adjusting shaft 40. Although not illustrated, in the double gear 32, the large gear 32b and small gear 32a have a common rotating shaft. The small gear 32a is integrated with the large gear 32b in the rotational direction.

The headlight module 2 according to the second embodiment includes the first reducer 130 and second reducer 131. The first reducer 130 is disposed between the first motor 25 and the first drive transmission portion 27. The second reducer 131 is disposed between the second motor 35 and the second drive transmission portion 28. Thus, the driver 50 can adjust the speed of movement of the projection lens 13 and the torque required for movement of the projection lens 13.
<Projection Lens Side Connection Member 41>

Figure 15:
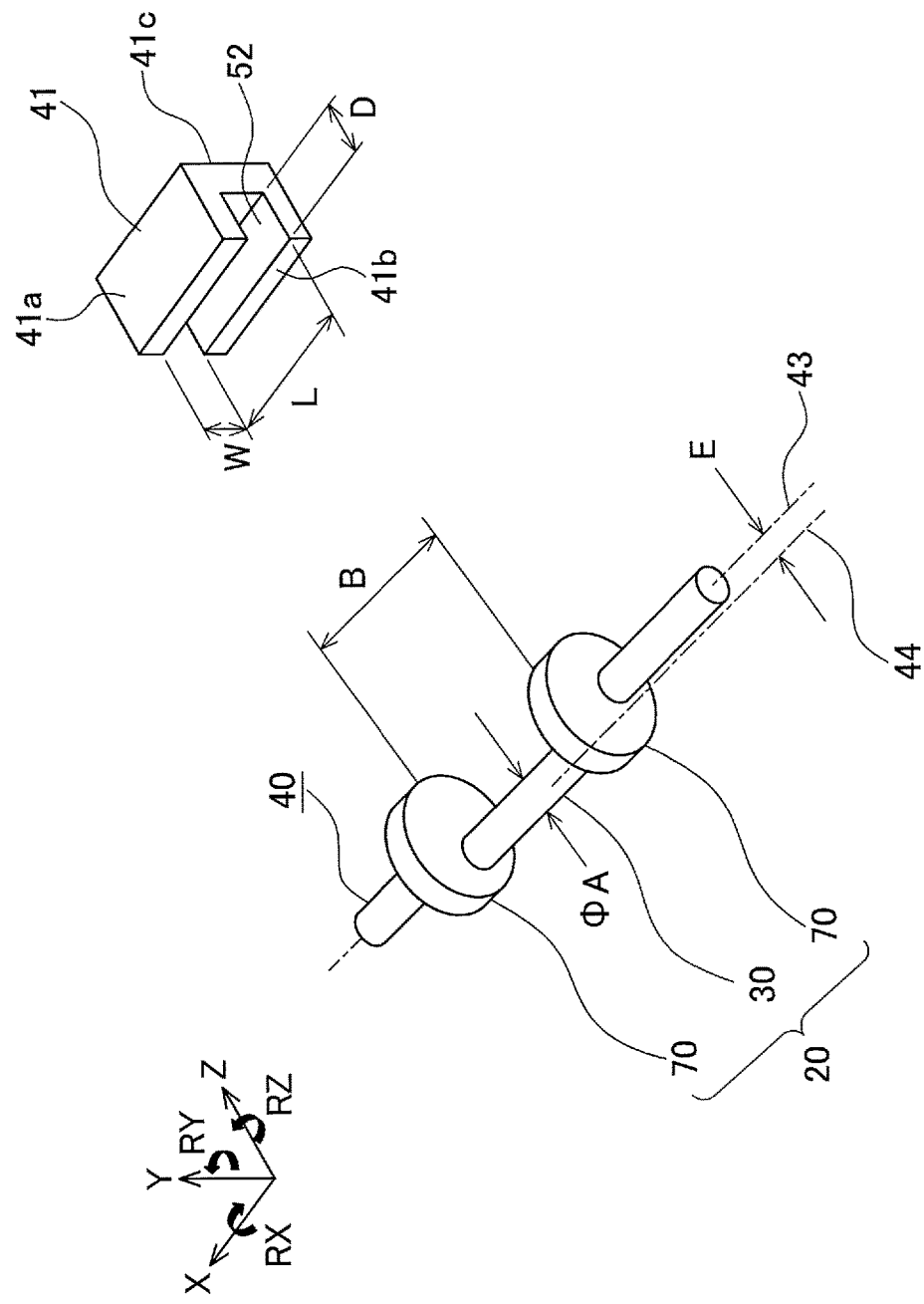
FIG. 15 is a diagram of components of the headlight module according to the second embodiment.

FIG. 15 is a diagram schematically illustrating configurations of the projection lens side connection member 41 and connection portion 20. The connection portion 20 is connected to the projection lens side connection member 41.

As illustrated in FIG. 15, the projection lens side connection member 41 extends in the X axis direction. "Extend" refers to extending. Here, it indicates that the projection lens side connection member 41 extends in the X axis direction.

The projection lens side connection member 41 has a C-shape opening in the −Z axis direction, in a YZ plane. "C-shape" refers to, for example, a U-shape. In FIG. 15, the corners of the U-shape have right angles. "C-shape" refers to, for example, a quadrangular shape lacking one side. In FIG. 15, the projection lens side connection member 41 has a tubular shape having a rectangular shape in its cross section perpendicular to the axis and lacking one side.

As illustrated in FIG. 15, the projection lens side connection member 41 includes three plate-like portions (plate-like portions 41a, 41b, and 41c). The plate-like portions 41a and 41b are disposed parallel to each other. In FIG. 15, the plate-like portions 41a and 41b are disposed parallel to a ZX plane. The plate-like portion 41c is disposed perpendicular to the plate-like portions 41a and 41b. In FIG. 15, the plate-like portion 41c is disposed parallel to an XY plane. The plate-like portion 41c connects the plate-like portions 41a and 41b. A portion opposite to the plate-like portion 41c is an opening. The plate-like portions 41a, 41b, and 41c each have a rectangular shape. A C-shaped groove 52 is a portion bounded by the plate-like portions 41a, 41b, and 41c.

In FIG. 15, a width W of the C-shaped groove 52 of the projection lens side connection member 41 in the Y axis direction is set so that the eccentric portion 30 (having a diameter $\phi A$ in its cross section) of the connection portion 20 of the adjusting shaft 40 can enter the C-shaped groove 52. The width W is greater than the diameter $\phi A$ of the eccentric portion 30, providing a gap allowing the eccentric portion 30 to rotate in the C-shaped groove 52.

A depth D of the C-shaped groove 52 of the projection lens side connection member 41 in the Z axis direction is greater than an eccentricity amount E of the eccentric portion 30. The "eccentricity amount E" is a distance between the central axis 43 of the adjusting shaft 40 and the central axis 44 of the eccentric portion.

Thus, when the adjusting shaft 40 rotates by 90 degrees in the RX axis direction from a position where the eccentric portion 30 is located in the +Z axis direction from the adjusting shaft 40, the eccentric portion 30 does not come out of the C-shaped groove 52. In FIG. 15, the central axis 43 and the central axis 44 of the eccentric portion are parallel to each other.

A length L of the C-shaped groove 52 of the projection lens side connection member 41 in the X axis direction is less than a distance B between the insides of the first engagement portions 70 disposed at both ends of the eccentric portion 30. That is, the distance B is greater than the length L.

The eccentric portion 30 is housed within the C-shaped groove 52 of the projection lens side connection member 41. When the eccentric portion 30 moves in the X axis direction, the eccentric portion 30 does not come off the C-shaped groove 52 of the projection lens side connection member 41. The eccentric portion 30 can cause the projection lens side connection member 41 to move smoothly.

<Operation of Driver 50>

The operation of the driver 50, the motion of the adjusting shaft 40 in accordance with the operation of the driver 50, and the motion of the projection lens 13 will now be described with reference to FIGS. 16 to 19.

Figure 16:
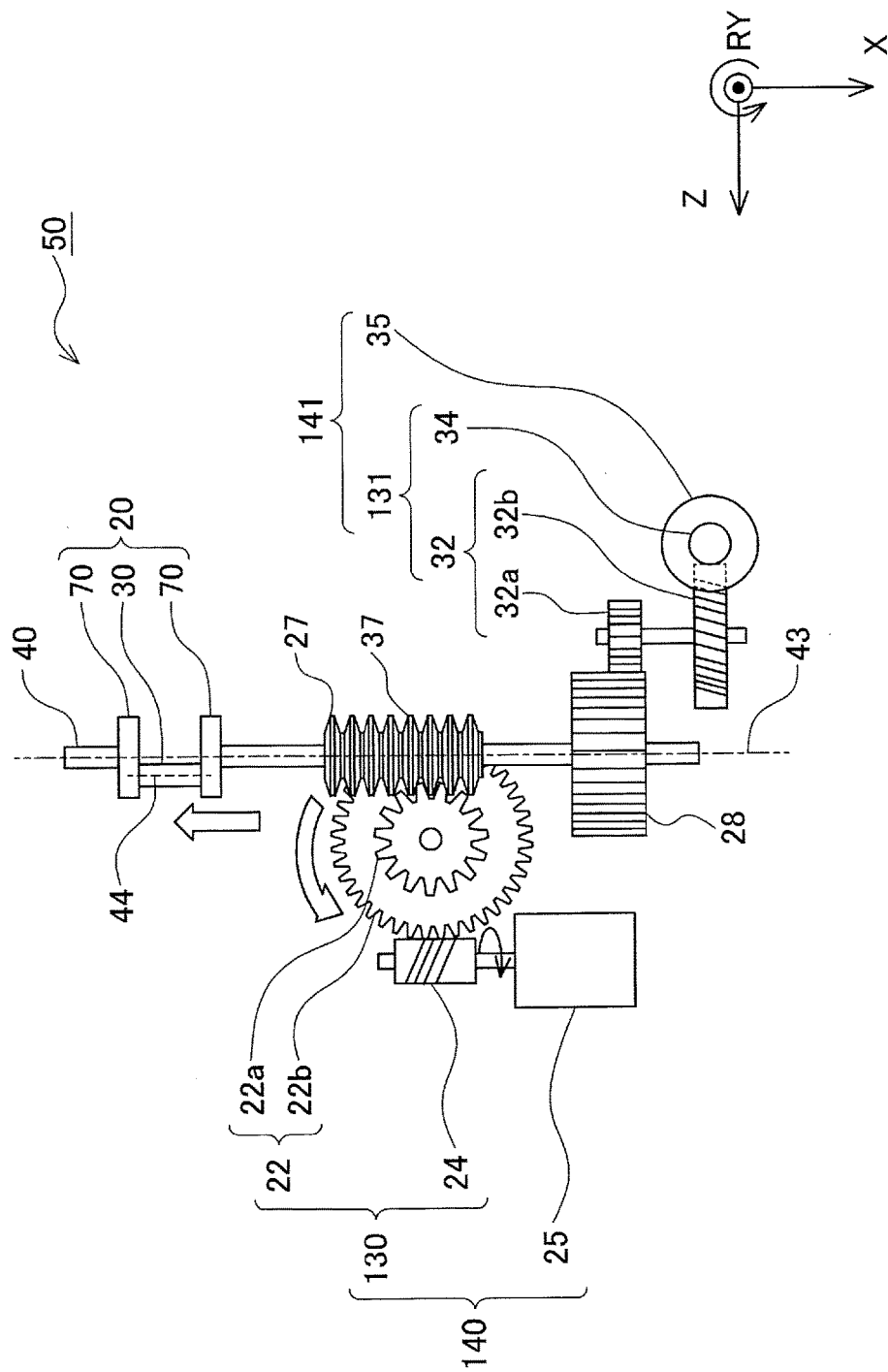
FIG. 16 is a diagram illustrating the operation of components of the headlight module according to the second embodiment.

FIG. 16 is a diagram illustrating an operation in which the adjusting shaft 40 moves in the direction of the central axis 43 when the first driver 140 drives the adjusting shaft 40.

As the first motor 25 rotates, the first worm gear 24 rotates about the X axis. The first worm gear 24 is fixed to the rotating shaft of the first motor 25. The rotating shaft of the first motor 25 is disposed parallel to the X axis. As the first worm gear 24 rotates, the large gear 22b rotates. The large gear 22b meshes with the first worm gear 24. The rotating shaft of the large gear 22b is disposed parallel to the Y axis.

With the rotation of the large gear 22b, the small gear 22a rotates. As the small gear 22a rotates, the first drive transmission portion 27 moves in the direction of the central axis 43 of the adjusting shaft 40. The first drive transmission portion 27 meshes with the small gear 22a. With the rack and pinion configuration, the first driver 140 converts rotation of the small gear 22a into linear motion of the adjusting shaft 40.

With the movement of the first drive transmission portion 27, the adjusting shaft 40 moves in the direction of the central axis 43. The adjusting shaft 40 can be moved in the +X axis direction or −X axis direction by selecting the direction of rotation of the first motor 25.

With the movement of the adjusting shaft 40 in the direction of the central axis 43, the connection portion 20 moves in the X axis direction. This moves the projection lens side connection member 41 in the X axis direction. The projection lens side connection member 41 moves in the X axis direction while sandwiched between the pair of the first engagement portions 70. The projection lens side connection member 41 is connected to the connection portion 20. The movement of the projection lens side connection member 41 in the X axis direction can move the projection lens 13 in the X axis direction.

In this case, the second drive transmission portion 28 moves in the direction of the central axis 43 while meshing with the small gear 32a. When the second drive transmission portion 28 and small gear 32a are spur gears, the movement of the second drive transmission portion 28 in the direction of the central axis 43 does not rotate the small gear 32a.

Figure 17A:
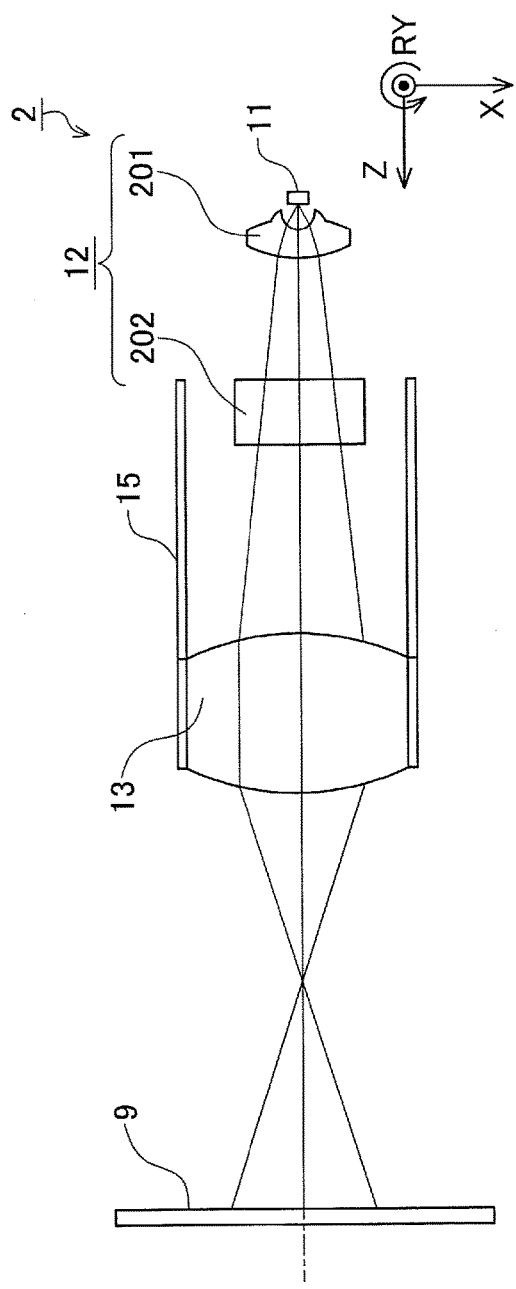
FIGS. 17A and 17B are diagrams illustrating the operation of components of the headlight module according to the second embodiment.
Figure 17B:
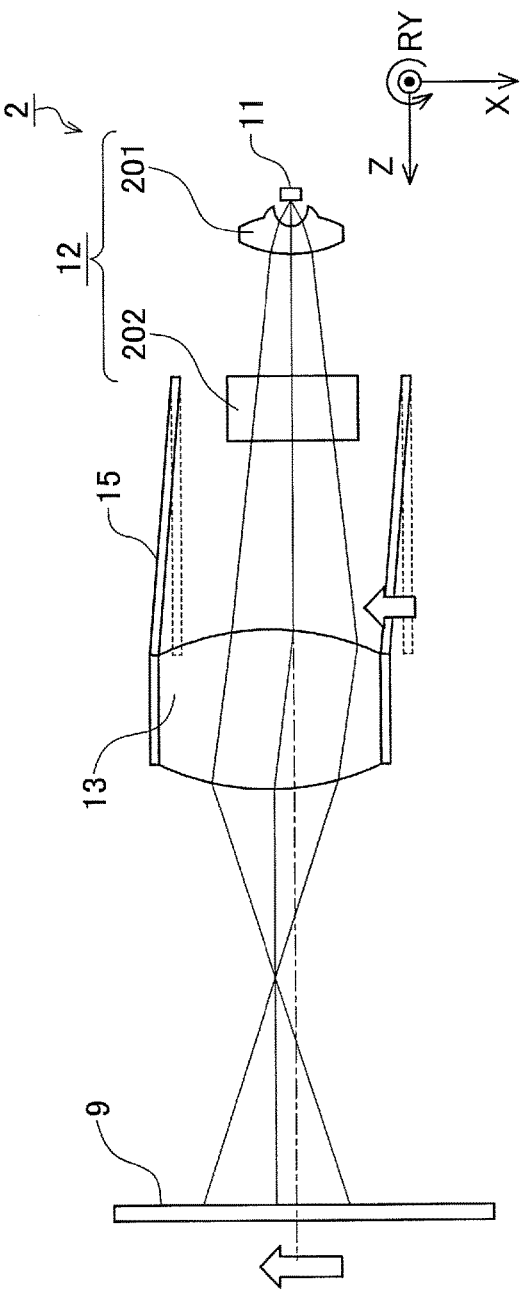

FIGS. 17A and 17B are diagrams for explaining an operation in which movement of the adjusting shaft 40 in the X axis direction moves the light distribution of the headlight module 2. To simplify explanation, the headlight module 2 is illustrated by two-dimensional schematic diagrams in an XZ plane. In FIGS. 17A and 17B, illustration of the elements of the headlight module 2 other than the projection lens 13, holder 15, lens 201, light guide member 202, and light source 11 is omitted.

FIG. 17A is a diagram when the projection lens 13 is located at a reference position. "Reference position" refers to a case where light with a light distribution pattern for when a vehicle travels straight in a horizontal attitude is radiated.

Light emitted from the light source 11 is concentrated by the lens 201. Thus, the divergence angle of light emitted from the lens 201 is less than the divergence angle of light emitted from the light source 11. In FIGS. 17A and 17B, for example, the light source 11 emits light in the +Z axis direction.

Light emitted from the light source 11 is incident on the light guide member 202. Light emitted from the lens 201 is incident on the light guide member 202. Part of the light incident on the light guide member 202 directly exits through the emitting surface of the light guide member 202. When viewed in a ZX plane, the light incident on the light guide member 202 is not reflected by the side surfaces of the light guide member 202. That is, when viewed in the ZX plane, the light incident on the light guide member 202 directly exits the light guide member 202.

The light exiting the optical unit 12 passes through the projection lens 13 and is imaged on an XY plane (the irradiated surface 9) located 10 m or more ahead in the +Z axis direction, for example. These light behaviors are the same as those in the first embodiment.

FIG. 17B is a diagram when the light distribution is shifted in the −X axis direction by shifting the projection lens 13 from the reference position in the −X axis direction.

A situation is assumed where, when the vehicle is going around a curve, an area of the curve toward which the vehicle is traveling is illuminated.

The first driver 140 (not illustrated) drives the first drive transmission portion 27 to move the projection lens side connection member 41 and projection lens 13 in the −X axis direction.

For example, as described in the first embodiment, to correct a shift amount of the optical axis of the projection lens 13 at a position 25 m ahead caused when the vehicle tilts forward by 5 degrees, the headlight module 2 only needs to shift the projection lens 13 by 1.5 to 2 mm in the Y axis direction. Likewise, when the lens 13 is shifted by 1.5 to 2 mm in the −X axis direction, the light distribution located 25 m ahead is shifted by approximately 2 m in the −X axis direction.

Figure 18:
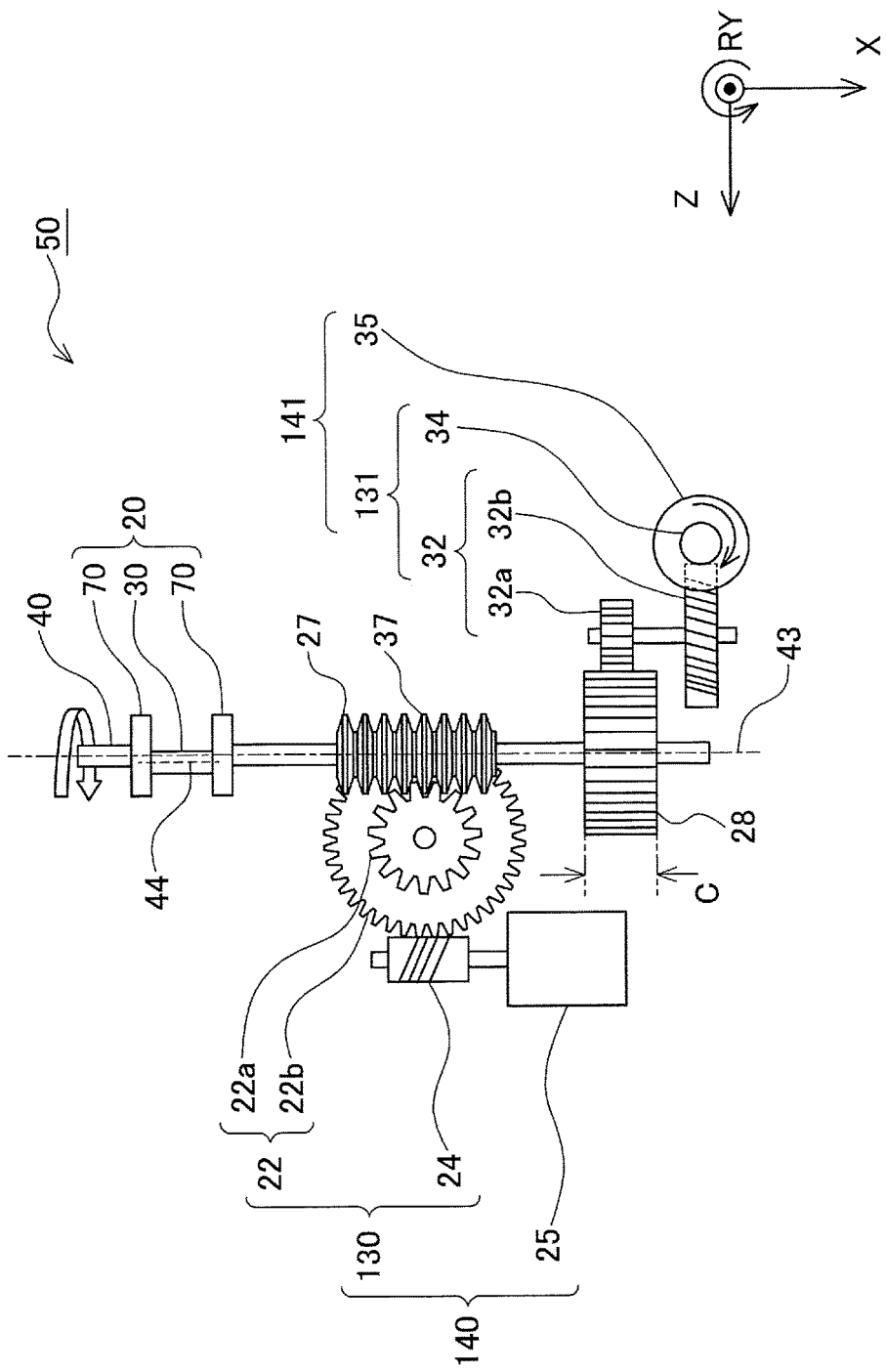
FIG. 18 is a diagram illustrating the operation of components of the headlight module according to the second embodiment.
Figure 19:
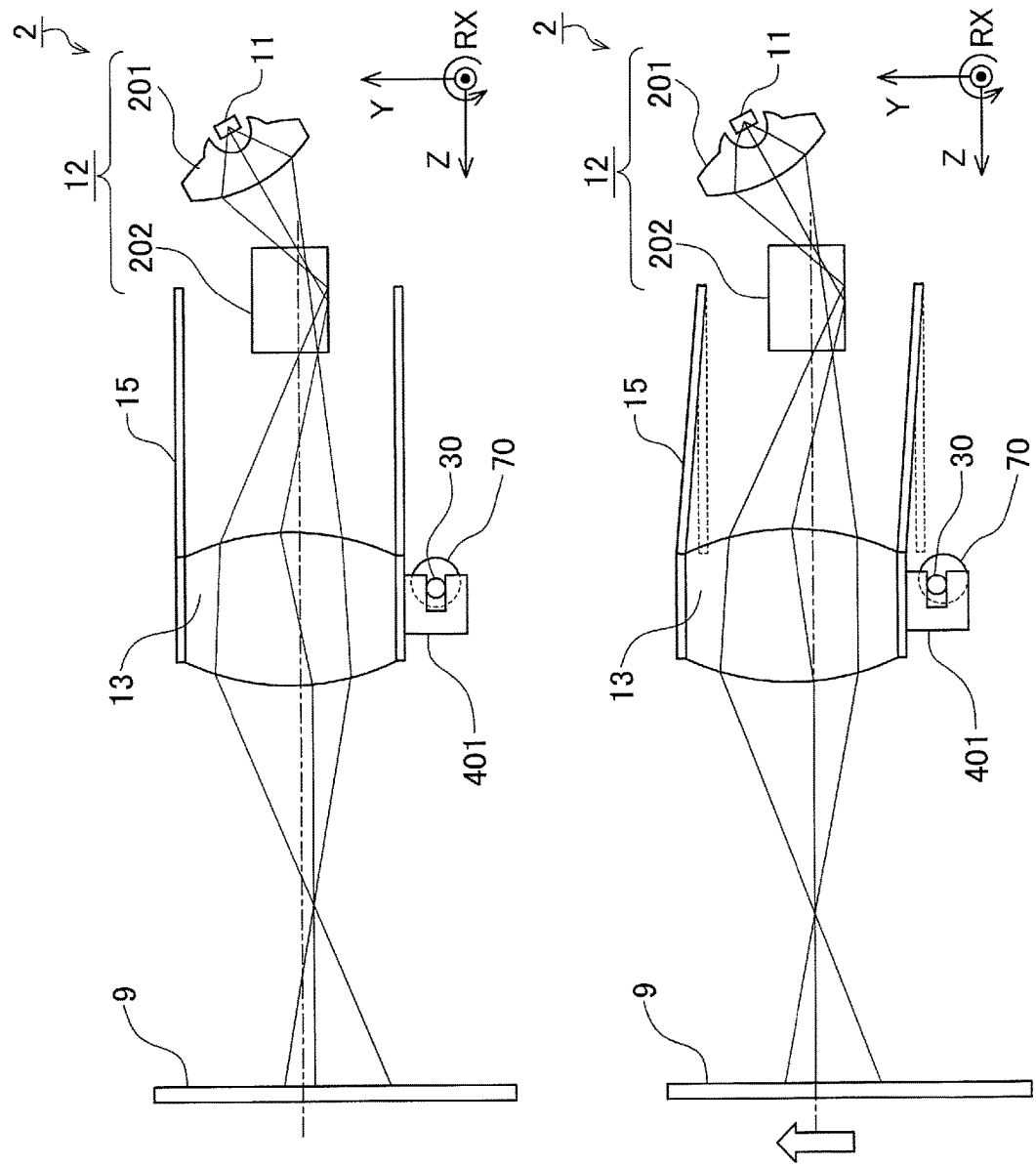
FIGS. 19A and 19B are diagrams illustrating the operation of components of the headlight module according to the second embodiment.

FIG. 18 is a diagram illustrating a situation where the adjusting shaft 40 rotates about the central axis (rotational axis) 43 when the second driver 141 drives the second drive transmission portion 28.

As the second motor 35 rotates, the second worm gear 34 rotates about the Y axis. The second worm gear 34 is fixed to the rotating shaft of the second motor 35. The rotating shaft of the second motor 35 is disposed parallel to the Y axis. As the second worm gear 34 rotates, the large gear 32b, which meshes with the second worm gear 34, rotates. The large gear 32*b* meshes with the second worm gear 34. The rotating shaft of the large gear 32*b* is disposed parallel to the X axis.

With the rotation of the large gear 32*b*, the small gear 32*a* rotates. The rotating shaft of the small gear 32*a* is disposed parallel to the X axis. As the small gear 32*a* rotates, the second drive transmission portion 28 rotates about the central axis 43 of the adjusting shaft 40. The second drive transmission portion 28 meshes with the small gear 32*a*.

The rotational axis of the second drive transmission portion 28 coincides with the central axis 43. The second drive transmission portion 28 is a spur gear. The small gear 32*a* is a spur gear. A spur gear is a gear whose teeth are parallel to its rotational axis.

With the rotation of the second drive transmission portion 28, the eccentric portion 30 rotates about the central axis 43. The central axis 44 of the eccentric portion 30 is eccentric by the eccentricity amount E with respect to the central axis 43. Thus, the eccentric portion 30 rotates about the central axis 43 at a radius equal to the eccentricity amount E. "Eccentric" indicates that a position is displaced from a center.

The rotation of the eccentric portion 30 moves the projection lens side connection member 41 in the Y axis direction. With the rotation of the adjusting shaft 40, the eccentric portion 30 rotates about the central axis 43. The eccentric portion 30 is fitted in the groove 52 of the projection lens side connection member 41. As the eccentric portion 30 rotates about the central axis 43, the projection lens side connection member 41 moves in the Y axis direction. The movement of the projection lens side connection member 41 can move the projection lens 13. The position of the projection lens 13 in the Y axis direction can be adjusted by adjusting the angle of rotation of the motor 35.

In this case, the first drive transmission portion 27 rotates about the central axis 43 while meshing with the small gear 22*a*. However, since the concavo-convex shape 37 is not spiral, rotation of the first drive transmission portion 27 does not rotate the small gear 22*a*.

As illustrated in FIG. 18, in the second embodiment, the second drive transmission portion 28 is a spur gear having a rotational axis coinciding with the central axis 43. A width C of the teeth of the second drive transmission portion 28 in the X axis direction is set to be greater than a width of the teeth of the small gear 32*a*.

Thus, when the adjusting shaft 40 is moved in the X axis direction by the first driver 140, the meshing is maintained. The width C of the teeth of the second drive transmission portion 28 in the X axis direction is, for example, preferably greater than or equal to the width of the range within which the adjusting shaft 40 is driven in the X axis direction.

FIGS. 19A and 19B are diagrams for explaining an operation in which movement of the eccentric portion 30 in the Y axis direction moves the light distribution of the headlight module 2. To simplify explanation, the headlight module 2 is illustrated by two-dimensional schematic diagrams in a YZ plane. In FIGS. 19A and 19B, illustration of the elements of the headlight module 2 other than the projection lens 13, holder 15, lens 201, light guide member 202, light source 11, projection lens side connection member 41, and adjusting shaft 40 is omitted.

FIG. 19A is a diagram when the projection lens 13 is located at the reference position.

Light emitted from the light source 11 is concentrated by the lens 201. In FIGS. 19A and 19B, for example, the light source 11 emits light in a direction inclined in the −Y axis direction with respect to the +Z axis direction.

Light emitted from the light source 11 is incident on the light guide member 202. Light emitted from the lens 201 is incident on the light guide member 202. The light guide member 202 is a component for forming a light distribution. A first part of the light incident on the light guide member 202 directly exits through the emitting surface of the light guide member 202. A second part of the light incident on the light guide member 202 is reflected by a side surface of the light guide member 202 and its traveling direction is changed to the +Y axis direction. In FIGS. 19A and 19B, the second part of the light incident on the light guide member 202 is reflected by a side surface on the −Y axis side of the light guide member 202.

Light emitted from the optical unit 12 passes through the projection lens 13 and is imaged on an XY plane (the irradiated surface 9) located 10 m or more ahead in the +Z axis direction, for example.

FIG. 19B is a diagram when the light distribution is shifted in the +Y axis direction by shifting the projection lens 13 from the reference position in the +Y axis direction.

A situation is assumed where the vehicle is tilted forward and downward due to the loading state of the vehicle or deceleration of the vehicle.

The second driver 141 (not illustrated) drives the second drive transmission portion 28 to move the projection lens side connection member 41 and projection lens 13 in the +Y axis direction. For example, as described in the first embodiment, to correct a shift amount of the optical axis of the projection lens 13 at a position 25 m ahead caused when the vehicle tilts forward by 5 degrees, the headlight module 2 only needs to shift the projection lens 13 by 1.5 to 2 mm in the +Y axis direction.

FIGS. 16 to 19 each illustrate an example in which one of the first driver 140 or second driver 141 is driven independently of the other. However, the first driver 140 and second driver 141 may be driven simultaneously.

In the first drive transmission portion 27, the concavo-convex shape 37 is formed in the direction of the central axis 43. The concavo-convex shape 37 has a shape of a solid of revolution about the central axis 43. Thus, for example, while the first driver 140 is operating, the first driver 140 and first drive transmission portion 27 do not disturb the operation of the second driver 141.

"Solid of revolution" refers to a solid obtained by rotating a plane figure once about a straight line on the same plane. Here, the plane figure has the shape of the concavo-convex shape 37 on a plane including the central axis 43. The straight line is the central axis 43.

In the headlight module 2 according to the second embodiment, the driver 50 includes the first driver 140 and second driver 141.

The first driver 140 moves the adjusting shaft 40 linearly in the direction of the rotational axis 43. The second driver 141 drives and rotates the adjusting shaft 40 about the rotational axis 43.

The adjusting shaft 40 includes the first drive transmission portion 27 and second drive transmission portion 28. The first drive transmission portion 27 transmits driving force from the first driver 140 in the direction of the central axis 43. The second drive transmission portion 28 transmits driving force from the second driver 141 in a rotational direction about the central axis 43.

Thus, motion of the projection lens 13 by means of the first driver 140 and motion of the projection lens 13 by means of the second driver 141 do not interfere with each other.

As above, the headlight module 2 can move the light distribution in the X axis direction by moving the adjusting shaft 40 in the direction of the central axis 43. It is possible to provide a headlight capable of increasing illuminance in a region that a driver is watching while traveling in a curve.

Further, the headlight module 2 can move the light distribution in the Y axis direction by rotating the adjusting shaft 40. It is possible to provide a headlight that illuminates a position at a constant height when the attitude of a vehicle varies depending on the loading state of the vehicle or acceleration and deceleration of the vehicle.

Further, by rotating the adjusting shaft 40 or moving the adjusting shaft 40 in the axial direction, it is possible to move the light distribution in the X axis direction or Y axis direction. The adjusting shaft 40 is connected to the projection lens 13. Thus, there is no need to provide independent shafts for respectively moving the projection lens 13 in the X axis direction and Y axis direction. This can downsize a structure around the projection lens 13. This can increase a degree of freedom in design of a headlight.

Figure 20:
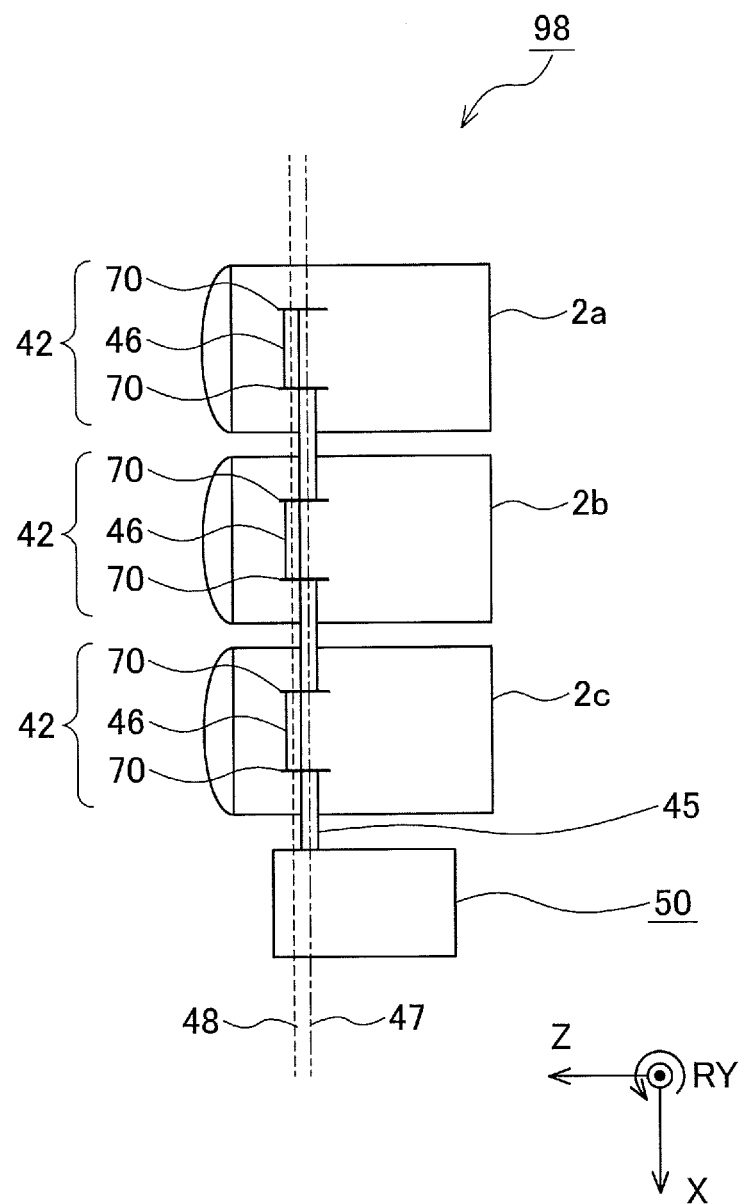
FIG. 20 is a configuration diagram of a headlight according to the second embodiment.

FIG. 20 is a diagram illustrating a configuration of a headlight 98 in which multiple headlight modules 2a, 2b, and 2c according to the second embodiment are arranged in the X axis direction.

As illustrated in FIG. 20, in the headlight 98, the multiple headlight modules 2a, 2b, and 2c are arranged in the X axis direction. An adjusting shaft 45 includes connection portions 42 at positions corresponding to the respective headlight modules 2a, 2b, and 2c.

The adjusting shaft 45 corresponds to the adjusting shaft 40 illustrated in FIG. 13. The connection portions 42 correspond to the connection portion 20 illustrated in FIG. 13. The adjusting shaft 45 includes the multiple connection portions 42. In FIG. 20, for example, the number of connection portions 42 included in the adjusting shaft 45 is three.

The connection portions 42 are connected to projection lens side connection members 41. The projection lens side connection members 41 are disposed in the respective headlight modules 2a, 2b, and 2c. In FIG. 20, the projection lens side connection members 41 are not illustrated.

The connection portions 42 each include first engagement portions 70 and an eccentric portion 46. The first engagement portions 70 engage with the projection lens side connection members 41 of the respective headlight modules 2a, 2b, and 2c in the X axis direction. The eccentric portions 46 engage with the projection lens side connection members 41 in the Y axis direction.

The adjusting shaft 45 has a central axis (rotational axis) 47, and the eccentric portions 46 have a central axis 48 at a position different from that of the central axis 47. The central axis 48 of the eccentric portions 46 is eccentric to the central axis (rotational axis) 47 of the adjusting shaft 45. The central axes 47 and 48 are parallel to each other. In FIG. 20, the central axes 47 and 48 are parallel to the X axis.

The connection between the projection lens side connection members 41 and the connection portions 42 is the same as that described in FIG. 15, so description thereof will be omitted.

As illustrated in FIG. 20, the multiple headlight modules 2a, 2b, and 2c are arranged in the X axis direction. This allows the headlight modules 2a, 2b, and 2c to be adjusted by a pair of the adjusting shaft 45 and driver 50. Thus, when the number of headlight modules 2 increases, it is possible to simplify the structure for driving the headlight modules 2, as compared to a case where the adjusting shaft 45 and driver 50 are provided for each headlight module 2.

When there are multiple headlight modules 2, it is possible to move the multiple projection lens 13 with a pair of the adjusting shaft 45 and driver 50 by using the configuration of the adjusting shaft 45 and driver 50 described in the second embodiment.

As described in FIG. 10 in the first embodiment, the headlight 98 adds the respective light distribution patterns of the multiple headlight modules 2a, 2b, and 2c. The headlight 98 can form a desired light distribution pattern using the multiple headlight modules 2a, 2b, and 2c.

The headlight module 2 according to the second embodiment includes the light source 11, projection lens 13, adjusting shaft 40, and driver 50.

The projection lens 13 receives light emitted from the light source 11. The projection lens 13 receives light emitted from the light source 11 as incident light. The projection lens 13 emits the incident light ahead of the vehicle as projection light. In the second embodiment, the projection lens 13 receives light emitted from the light guide member 202.

The adjusting shaft 40 includes the connection portion 20 connected to the projection lens 13. The connection portion 20 includes the eccentric portion 30. The eccentric portion 30 has the central axis 44 at a position different from that of the central axis 43 of the adjusting shaft 40. The central axis 44 is eccentric to the central axis 43.

The driver 50 moves the adjusting shaft 40 in the direction of the central axis 43, and drives and rotates the adjusting shaft 40 about the central axis 43. The central axis 43 is an axis of the adjusting shaft 40.

Thus, the headlight module 2 can further suppress increase in size of a structure capable of moving a light distribution in the up-down direction or left-right direction.

In the headlight module 2 according to the second embodiment, the projection lens 13 is held by the lens holder 19. The lens holder 19 includes the projection lens side connection member 41. The projection lens side connection member 41 connects the connection portion 20 and the lens holder 19. The connection portion 20 includes the first engagement portions 70. The first engagement portions 70 engage with the projection lens side connection member 41 in the direction of the rotational axis 43.

Thus, the first engagement portions 70 are elements for limiting movement of the projection lens 13 in the horizontal direction (X axis direction). The X axis direction is the horizontal direction of the headlight module 2. The first engagement portions 70 can simplify the structure of the projection lens side connection member 41.

The headlight 98 according to the second embodiment may include the multiple headlight modules 2a, 2b, and 2c according to the second embodiment. The headlight 98 forms a light distribution pattern projected ahead of the vehicle, by superposing or arranging respective projection lights emitted from the headlight modules 2a, 2b, and 2c. Thus, the headlight 98 can use the multiple headlight modules 2a, 2b, and 2c and combine their respective light distribution patterns, thereby forming a desired light distribution pattern.

When the headlight 98 includes the single headlight module 2, the headlight module 2 itself is the headlight 98. The same applies to the first embodiment.

In the above second embodiment, limitation of the projection lens 13 in the X axis direction is achieved by engagement of the first engagement portions 70 with both ends of the projection lens side connection member 41 in the X axis direction. However, this configuration is not mandatory.

Figure 21:
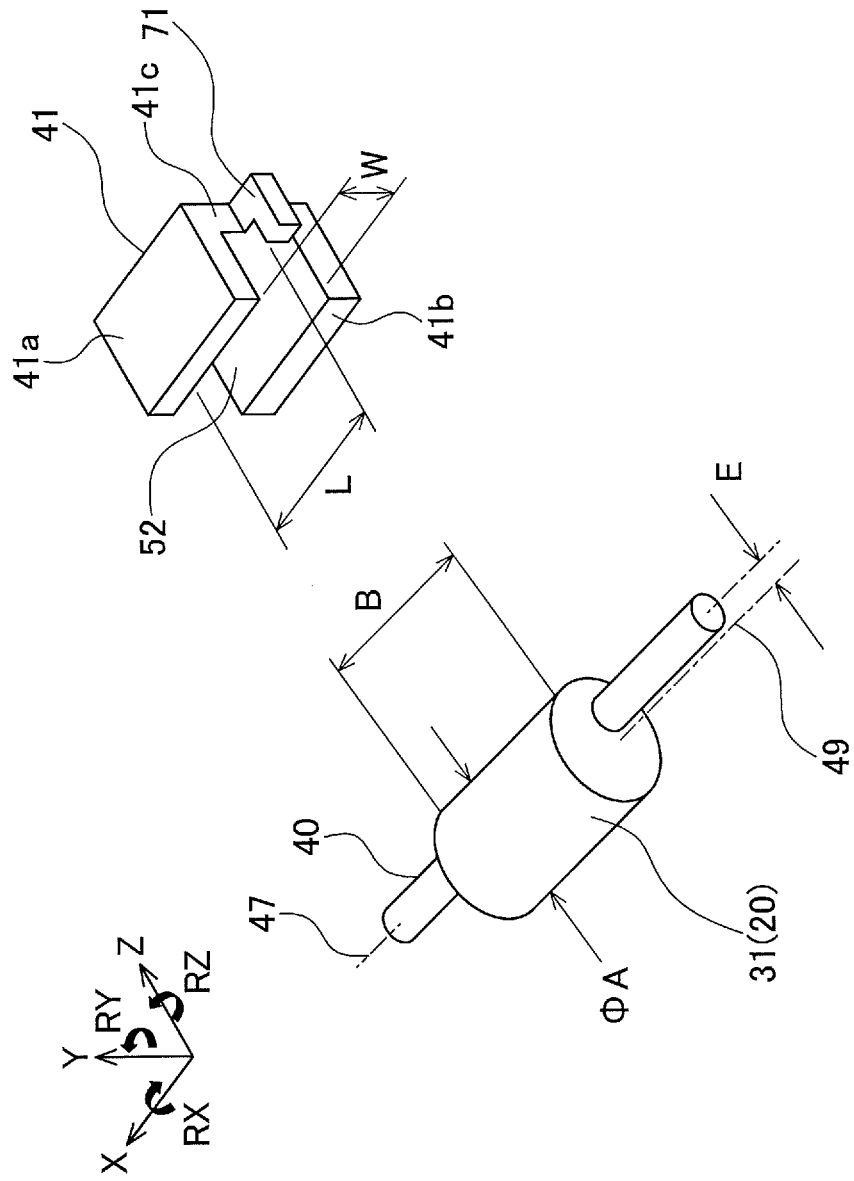
FIG. 21 is a diagram illustrating a modification of components of the headlight module according to the second embodiment.

FIG. 21 is a diagram illustrating a modification of the projection lens side connection member 41.

For example, as illustrated in FIG. 21, movement of an eccentric portion 31 in the X axis direction may be limited by providing second engagement portions 71 at both ends of the projection lens side connection member 41 in the X axis direction. In FIG. 21, the eccentric portion 31 is larger than the outer diameter of the adjusting shaft 40. No first engagement portions 70 are provided. In this case, the eccentric portion 31 corresponds to the connection portion 20.

The second engagement portions 71 project from side surfaces of the projection lens side connection member 41 toward an inside of the projection lens side connection member 41. The side surfaces of the projection lens side connection member 41 are a surface on the +X axis side and a surface on the −X axis side of the projection lens side connection member 41. The inside of the projection lens side connection member 41 is, for example, a portion bounded by three surfaces of the projection lens side connection member 41.

The second engagement portions 71 project from the side surfaces of the projection lens side connection member 41 toward a portion in which the eccentric portion 31 is housed. The second engagement portions 71 project from the side surfaces of the projection lens side connection member 41 toward a central axis 49 when the eccentric portion 31 is housed. The central axis 49 is a central axis of the eccentric portion 31.

The second engagement portions 71 are disposed on the side surfaces on both sides of the projection lens side connection member 41.

In FIG. 21, for example, the second engagement portions 71 are disposed on side surfaces of the plate-like portion 41c. However, the second engagement portions 71 may be disposed on side surfaces of the plate-like portions 41a and 41b.

A length B of the eccentric portion 31 in the X axis direction is set to be less than a distance L between the second engagement portions 71 disposed on the side surfaces on the both sides of the projection lens side connection member 41. Otherwise, the configuration is the same as that of FIG. 15, so description thereof will be omitted.

In the headlight module 2 according to the second embodiment, the projection lens 13 is held by the lens holder 19. The lens holder 19 includes the projection lens side connection member 41. The projection lens side connection member 41 connects the connection portion 20 (eccentric portion 31) and lens holder 19. The projection lens side connection member 41 includes the second engagement portions 71. The second engagement portions 71 engage with the eccentric portion 31 in a direction of the rotational axis 47.

The second engagement portions 71 are elements for limiting movement of the projection lens 13 in the horizontal direction (X axis direction). The X axis direction is the horizontal direction of the headlight module 2. The second engagement portions 71 can simplify the structure of the adjusting shaft 40.

FIG. 22 is a diagram illustrating another modification of the projection lens side connection member 41.

Another way of achieving limitation of the projection lens 13 in the X axis direction will be described.

The projection lens side connection member 41 illustrated in FIG. 22 includes a third engagement portion 72 in the C-shaped groove 52. An eccentric portion 31 includes a fourth engagement portion 73. The fourth engagement portion 73 engages with the third engagement portion 72. In this case, the eccentric portion 31 and fourth engagement portion 73 correspond to the connection portion 20.

The third engagement portion 72 is a projection that projects from the plate-like portions 41a, 41b, and 41c toward the groove 52. In FIG. 22, the third engagement portion 72 has a rib shape. The third engagement portion 72 is perpendicular to the central axis 49. The third engagement portion 72 projects from the plate-like portion 41b.

The fourth engagement portion 73 is a groove provided in the eccentric portion 31. The groove of the fourth engagement portion 73 is formed perpendicular to the central axis 49. The groove of the fourth engagement portion 73 is formed in a circumferential direction on a side surface of a cylindrical shape of the eccentric portion 31.

In FIG. 22, the projection is provided in the C-shaped groove 52 of the projection lens side connection member 41. This projection is the third engagement portion 72. The groove is provided in the eccentric portion 31. This groove is the fourth engagement portion 73. The fourth engagement portion 73 engages with the third engagement portion 72.

It is also possible that the third engagement portion 72 is a groove and the fourth engagement portion 73 is a projection.

The other structure except the third engagement portion and fourth engagement portion is the same as that of FIGS. 15 and 21, so description thereof will be omitted.

In the headlight module 2 according to the second embodiment, the projection lens 13 is held by the lens holder 19. The lens holder 19 includes the projection lens side connection member 41. The projection lens side connection member 41 includes the third engagement portion 72. The third engagement portion 72 is connected to the eccentric portion 31 (connection portion 20). The eccentric portion 31 includes the fourth engagement portion 73. The fourth engagement portion 73 engages with the third engagement portion 72.

Thus, it is possible to simultaneously achieve downsizing of the connection portion 20 and projection lens side connection member 41. The connection portion 20 is provided in the adjusting shaft 40.

As in the first embodiment, in each of the above-described embodiments, terms, such as plane or perpendicular, indicating the positional relationships between parts include ranges taking account of manufacturing tolerances, assembly variations, or the like.

Although the embodiments of the present invention have been described as above, the present invention is not limited to these embodiments.

Appendixes are described below.

<Appendix 1>

A headlight module comprising:

a light source that emits light;

a projection lens that receives, as incident light, light emitted from the light source and emits it as projection light ahead of a vehicle;

a holder including a flexible portion having a length in a direction of an optical axis of the projection lens, the flexible portion having one end that is a fixed end and another end that is a movable end, the projection lens being connected to the movable end, the holder holding the projection lens so that the projection lens can translate on a plane perpendicular to the optical axis of the projection lens with respect to an optical member, due to deflection of the flexible portion; and a driver that moves the projection lens on the plane.
<Appendix 2>
The headlight module of Appendix 1, wherein:
the holder includes a first plate spring portion and a second plate spring portion parallel to the optical axis and perpendicular to each other; and
one end of the first plate spring portion is the fixed end, another end of the first plate spring portion is connected to one end of the second plate spring portion, and another end of the second plate spring portion is the movable end.
<Appendix 3>
A headlight module comprising:
a light source;
a projection lens that receives, as incident light, light emitted from the light source and emits, as projection light, the incident light ahead of a vehicle;
an adjusting shaft including a connection portion connected to the projection lens; and
a driver that drives the projection lens adjusting shaft in a direction of the adjusting shaft and rotates the projection lens adjusting shaft about the shaft, wherein the connection portion includes an eccentric portion having a central axis at a position different from that of a rotational axis of the adjusting shaft.
<Appendix 4>
The headlight module of Appendix 3, wherein:
the projection lens includes a projection lens side connection member connected to the connection portion; and
the connection portion includes a first engagement portion that engages with the projection lens side connection member in a direction of the rotational axis.
<Appendix 5>
The headlight module of Appendix 3, wherein:
the projection lens includes a projection lens side connection member connected to the connection portion; and
the projection lens side connection member includes a second engagement portion that engages with the eccentric portion in a direction of the rotational axis.
<Appendix 6>
The headlight module of Appendix 3, wherein:
the projection lens includes a projection lens side connection member connected to the connection portion and including a third engagement portion; and
the eccentric portion includes a fourth engagement portion that engages with the third engagement portion.
<Appendix 7>
The headlight module of any one of Appendixes 3 to 6, wherein:
the driver includes a first driver that drives the adjusting shaft in a direction of the rotational axis, and a second driver that drives and rotates the adjusting shaft about the rotational axis; and
the adjusting shaft includes a first transmission portion that transmits driving force from the first driver in a direction of the shaft, and a second transmission portion that transmits driving force from the second driver in a circumferential direction about the shaft.
<Appendix 8>
The headlight module of claim 7, further comprising:
a first reducer disposed between the first driver and the first transmission portion; and
a second reducer disposed between the second driver and the second transmission portion.
<Appendix 9>
A headlight comprising a plurality of the headlight modules of any one of Appendixes 1 to 8, wherein the headlight forms a light distribution pattern projected ahead of the vehicle by superposing or arranging the respective projection lights emitted from the headlight modules.

REFERENCE SIGNS LIST 1, 1a, 1b, 1c, 2, 2a, 2b, 2c headlight module, 11 light source, 12 optical unit, 13 projection lens, 14, 19 lens holder, 15 holder, 15a, 15b parallel spring, 16, 50 driver, 17, 18 base, 20, 42 connection portion, 22 double gear, 22a small gear, 22b large gear, 27 first drive transmission portion, 28 second drive transmission portion, 30, 31, 46 eccentric portion, 32 double gear, 32a small gear, 32b large gear, 34 first worm gear, 35 second motor, 37 concavo-convex shape, 40, 45 adjusting shaft, 41 projection lens side connection member, 41a, 41b, 41c plate-like portion, 43, 44, 47, 48, 49 central axis, 50 driver, 52 groove (C-shaped groove), 70 first engagement portion (flange portion), 71 second engagement portion, 72 third engagement portion, 73 fourth engagement portion, 9 irradiated surface, 91, 92 irradiation region, 93 edge of a road, 95, 98 headlight, 96 cover, 97 housing, 101 LED light source, 102 heat dissipation unit, 130 first reducer, 131 second reducer, 140 first driver, 141 second driver, 201 lens, 202 light guide member, 301 lens surface, 302 flange portion, 401 lens holder body, 402 X axis adjustment shaft, 403 Y axis adjustment shaft, 404 female screw hole, 405 fitting portion, 502, 502a, 502b X axis direction flexible portion, 503, 503a, 503b Y axis direction flexible portion, 601, 601x, 601y drive source, 602, 602x, 602y feed screw shaft, 603, 603x, 603y cam part, 604 cam body, 605 cam groove, 606 support shaft, 701 base body, 702 plate spring, 703, 708 female screw hole, 704, 704x, 704y shaft hole, 705, 705x, 705y elongated hole, φA diameter, B distance, C tooth width, E eccentricity amount, L length, W width.

The invention claimed is:
1. A headlight module comprising:
a light source that emits light;
a projection lens that receives the light as incident light and emits the light as projection light;
a holder including a flexible portion having, in a first direction parallel to an optical axis of the projection lens, one end that is a fixed end and another end that is a movable end, the holder holding the projection, lens with the movable end so that the projection lens moves with respect to the light source; and
a driver that moves the projection lens, wherein:
the flexible portion includes a first flexible portion and a second flexible portion;
the first flexible portion includes a first substantially planar portion extending in, both the first direction and a second direction perpendicular to the first direction;
the second flexible portion includes a second substantially planar portion extending in both the first direction and a third direction perpendicular to both the first direction and the second direction; and
one end of the first flexible portion is the fixed end, another end of the first flexible portion is connected to one end of the second flexible portion, and another end of the second flexible portion is the movable end; and
the projection lens is moved in the third direction due to deflection of the first flexible portion in the third direction, and moved in the second direction due to deflection of the second flexible portion in the second direction.
2. The headlight module of claim 1, wherein the substantially planar portions are plate springs.

3. The headlight module of claim 1, further comprising an adjustment shaft that moves together with the projection lens, wherein:
the driver includes a cam part that moves in the direction of the optical axis; and
the adjustment shaft and the cam part constitute a cam mechanism.

4. The headlight module of claim 1, further comprising a cam groove that moves together with the projection lens, wherein:
the driver includes an adjustment shaft that moves in the direction of the optical axis; and
the adjustment shaft and the cam groove constitute a cam mechanism.

5. The headlight module of claim 1, further comprising an adjusting shaft including a connection portion that transmits driving force to the projection lens,
wherein the driver moves the adjusting shaft in a direction of a first central axis of the adjusting shaft and rotates the adjusting shaft about the first central axis.

6. The headlight module of claim 5, wherein:
the connection portion includes an eccentric portion; and
the eccentric portion has a second central axis that is parallel to the first central axis and is at a position different from that of the adjusting shaft.

7. The headlight module of claim 5, further comprising a projection lens side connection portion that moves together with the projection lens and is connected to the connection portion.

8. The headlight module of claim 7, wherein the connection portion includes a first engagement portion that engages with the projection lens side connection portion in the direction of the first central axis.

9. The headlight module of claim 6, further comprising a projection lens side connection portion that moves together with the projection lens and is connected to the connection portion,
wherein the projection lens side connection portion includes a second engagement portion that engages with the eccentric portion in the direction of the first central axis.

10. The headlight module of claim 6, further comprising a projection lens side connection portion that moves together with the projection lens and is connected to the connection portion, wherein;
the eccentric portion includes a third engagement portion;
the projection lens side connection portion includes a fourth engagement portion; and
the third engagement portion engages with the fourth engagement portion in the direction of the first central axis.

11. The headlight module of claim 5, wherein:
the driver includes a first driver that moves the adjusting shaft in the direction of the first central axis; and
the adjusting shaft includes a first drive transmission portion that transmits driving force from the first driver in the direction of the first central axis.

12. The headlight module of claim 11, wherein a cross-section of the first drive transmission portion taken along a plane including the first central axis has a concavo convex shape, and the first drive transmission portion has a shape of a solid of revolution about the first central axis.

13. The headlight module of claim 5, wherein:
the driver includes a second driver that rotates the adjusting shaft about the first central axis; and
the adjusting shaft includes a second drive transmission portion that transmits driving force from the second driver in a circumferential direction about the first central axis.

14. A headlight comprising a plurality of the headlight modules of claim 1, wherein the headlight forms a projected light distribution pattern by superposing or arranging the respective projection lights emitted from the headlight modules.

* * * * *